United States Patent [19]
Faber et al.

[11] 3,983,541
[45] Sept. 28, 1976

[54] POLYMORPHIC PROGRAMMABLE UNITS EMPLOYING PLURAL LEVELS OF PHASED SUB-INSTRUCTION SETS

[75] Inventors: Ulbe Faber, Honeybrook; Robert L. Davis, Downingtown; David A. Fisher, Pittsburgh; Joseph D. McGonagle, Media, all of Pa.

[73] Assignee: Burroughs Corporation, Detroit, Mich.

[22] Filed: July 10, 1975

[21] Appl. No.: 594,576

Related U.S. Application Data

[62] Division of Ser. No. 825,569, May 19, 1969.

[52] U.S. Cl. .......................................... 340/172.5
[51] Int. Cl.² ........................................ G06F 9/06
[58] Field of Search ................................ 340/172.5

[56] References Cited
UNITED STATES PATENTS

| | | | |
|---|---|---|---|
| 3,234,523 | 2/1966 | Blixt et al. | 340/172.5 |
| 3,245,048 | 4/1966 | Carter et al. | 340/172.5 |
| 3,247,492 | 4/1966 | Furlong | 340/172.5 |
| 3,248,707 | 4/1966 | Paul et al. | 340/172.5 |
| 3,302,183 | 1/1967 | Bennett et al. | 340/172.5 |
| 3,315,235 | 4/1967 | Carnevale et al. | 340/172.5 |
| 3,391,394 | 7/1968 | Ottaway et al. | 340/172.5 |
| 3,404,378 | 10/1968 | Threadgold et al. | 340/172.5 |
| 3,417,379 | 12/1968 | Heard et al. | 340/172.5 |
| 3,426,328 | 2/1969 | Gunderson | 340/172.5 |
| 3,426,331 | 2/1969 | Joyce | 340/172.5 |
| 3,564,507 | 2/1971 | Faivre et al. | 340/172.5 |
| 3,577,190 | 5/1971 | Cocke et al. | 340/172.5 |

OTHER PUBLICATIONS
A. Grasselli, "The Design of Program–Modifiable Micro–Programmed Control Units", *IRE Transactions on Electronic Computers*, June 1962, pp. 336–339.

*Primary Examiner*—Raulfe B. Zache
*Attorney, Agent, or Firm*—Mervyn L. Young; Edward J. Feeney, Jr.; Edmund M. Chung

[57] ABSTRACT

This disclosure relates to a programmable unit employing plural levels of sub-instruction sets in addition to conventional instruction sets. The conventional level of instruction sets is employed to specify computational routines and other processing algorithms to be carried out by the unit. Each instruction in a conventional set is implemented in the unit by a sequence of first level sub-instructions which specify the various operations to be carried out within the unit which operations are comprised within the specific routine. In turn, the various first level sub-instructions are implemented by second level sub-instructions which specify the various control signals required to set the various gates as required for the particular unit operation to be carried out. With this hierarchy of sub-instruction sets, first level sub-instruction sets may be interchanged dynamically during the operation of the unit to dynamically change the processing capability of the unit. This eliminates the requirement for any special logic circuitry to accommodate particular computational routines and allows the arithmetic logic unit to be designed as multiples of the basic logic unit in accordance with particular desired data path widths. A manner is disclosed by which the interchanging of first level sub-instruction sets provides for placing the unit in different control modes such as input-output control or processing control. A manner is also disclosed by which interchanging of different first level sub-instruction sets accommodates the execution of programs written in different program language forms.

13 Claims, 26 Drawing Figures

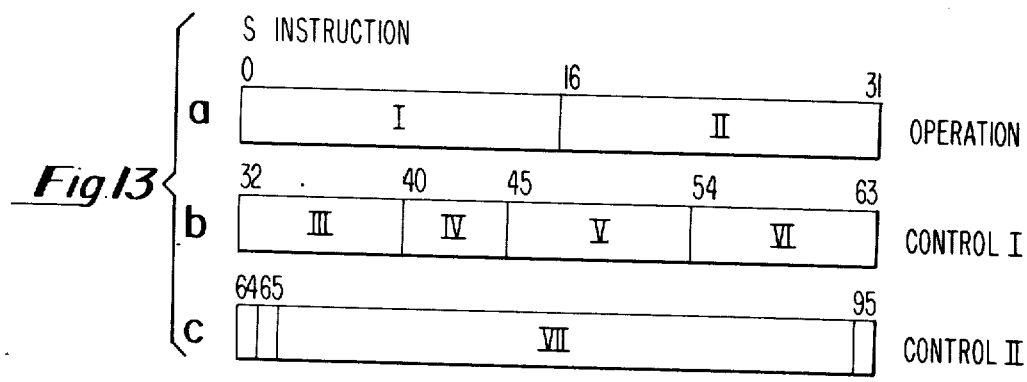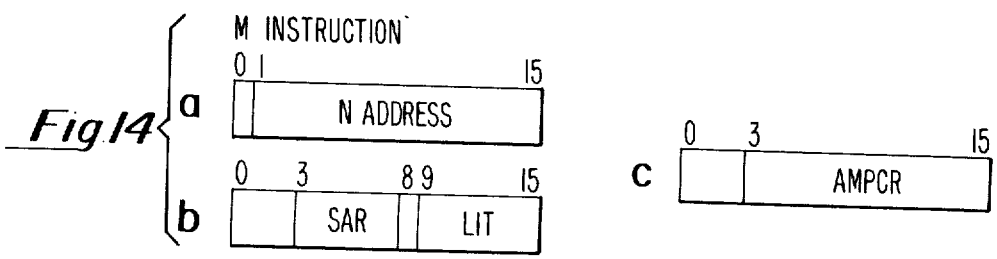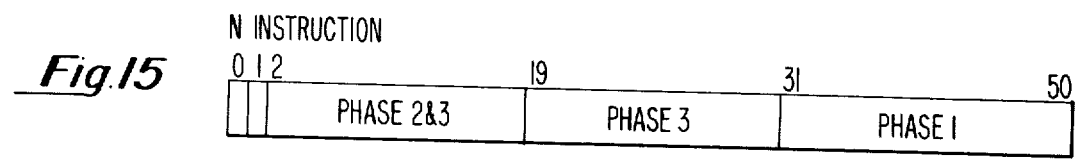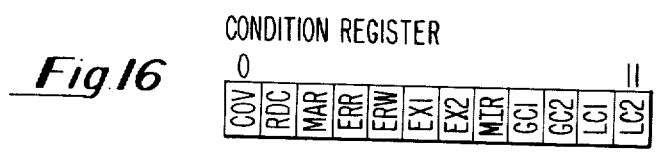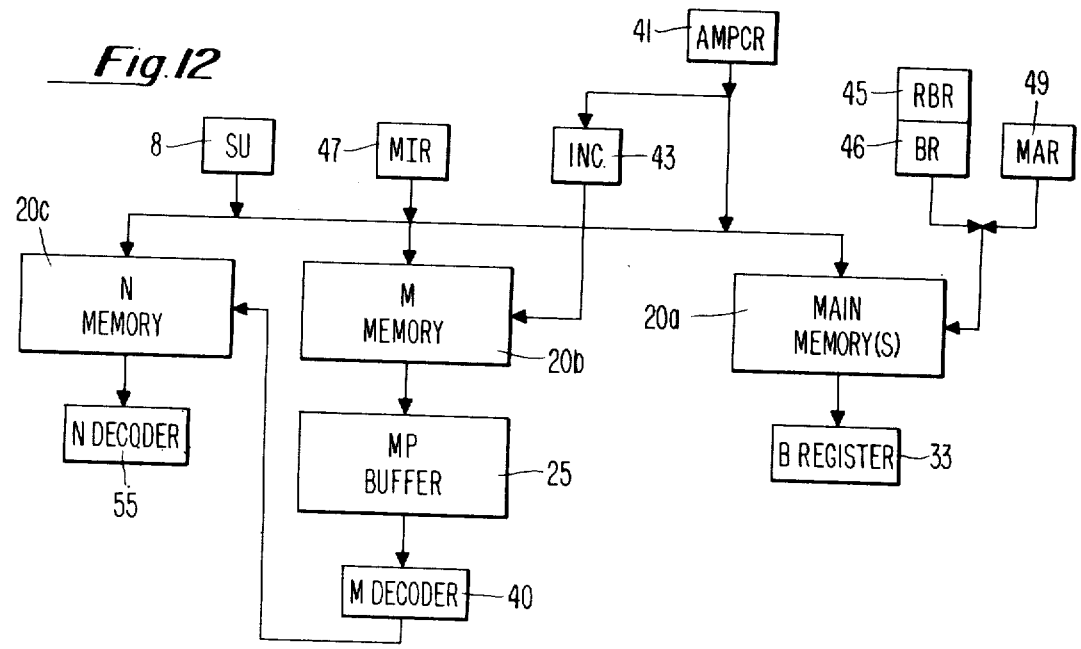

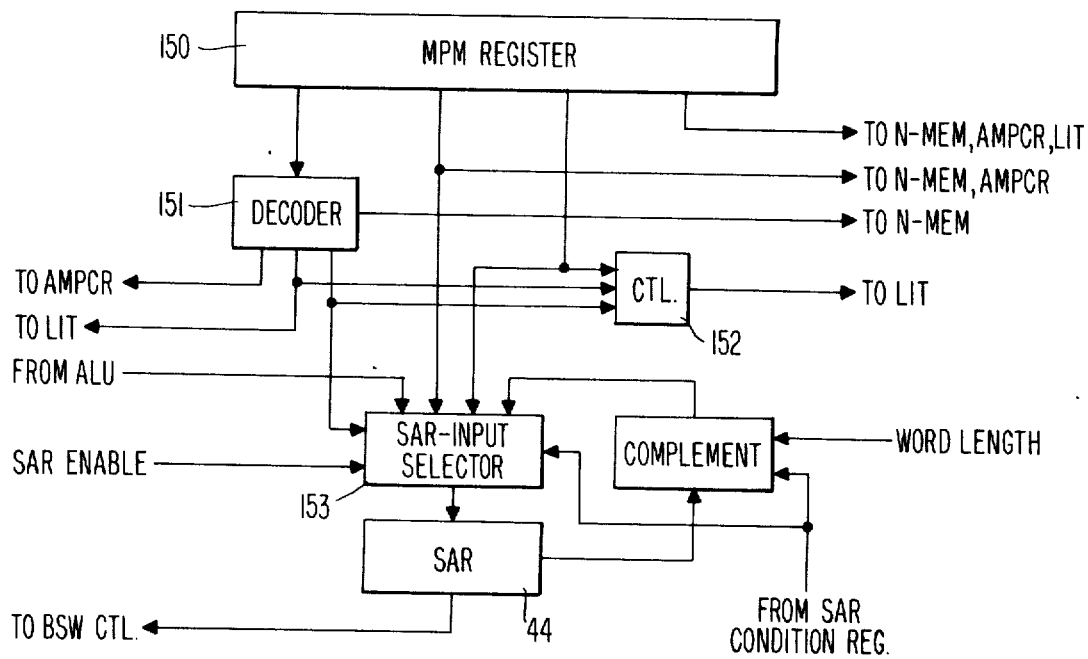

| | | N18 | N19 | N20 | OPERATION |
|---|---|---|---|---|---|
| 1. B-REG. INPUT | | 0 | 0 | 0 | B-UNCHANGED |
| | | 0 | 0 | 1 | ADDER→B REGISTER |
| | | 0 | 1 | 0 | BSW→B REGISTER |
| | | 0 | 1 | 1 | ADDER+BSW→B REGISTER |
| | | 1 | 0 | 0 | 4 BIT & 8 BIT CARRIES→B REGISTER |
| | | 1 | 0 | 1 | 8 BIT CARRIES→B REGISTER |
| | | 1 | 1 | 0 | BSW+EXTERNAL DATA→B REGISTER |
| | | 1 | 1 | 1 | EXTERNAL DATA→B REGISTER |

| | | N21 | N22 | OPERATION |
|---|---|---|---|---|
| 2. A-REG. INPUT | | 0 | 0 | A REGISTERS UNCHANGED |
| | | 0 | 1 | BSW→A1 |
| | | 1 | 0 | BSW→A2 |
| | | 1 | 1 | BSW→A3 |

PHASE 3 CONTROLS

| | N23 | |
|---|---|---|
| 3. MAR INP SELECT | 0 | LIT→MAR INPUT SELECT |
| | 1 | BSW BYTE→MAR INPUT SELECT |

| | N24 | N25 | |
|---|---|---|---|
| 4. CTR REG. IMP. | 0 | 0 | NO CHANGE TO COUNTER REGISTER |
| | 0 | 1 | MAR INP SEL→CNTR REGISTER |
| | 1 | 0 | COUNTER INCREMENTER→CNTR REGISTER |
| | 1 | 1 | LOAD ALL 1'S→CNTR REGISTER |

*Fig. 19*

PHASE 2 & 3 CONTROLS

| | | $N_1$ | $N_2$ | | OPERATION |
|---|---|---|---|---|---|
| 1. | A-REG. OUTPUTS | 0 | 0 | | $A_3$ |
| | | 0 | 1 | | $A_2$ |
| | | 1 | 0 | | $A_1$ |
| | | 1 | 1 | | ALL ZEROS |

| | | $N_3$ | $N_4$ | | OPERATION |
|---|---|---|---|---|---|
| 2. | B-REG. OUTPUTS | 0 | 0 | | MSB OUTPUT = 0 (MAY HAVE SPIKES WHEN LATCH CHANGES STATES) |
| | | 0 | 1 | | MSB OUTPUT IS COMP. |
| | | 1 | 0 | | MSB OUTPUT IS TRUE |
| | | 1 | 1 | | MSB OUTPUT = 1 |

| | $N_5$ | $N_6$ | | |
|---|---|---|---|---|
| | 0 | 0 | | LSB OUTPUT = 0 (MAY HAVE SPIKES) |
| | 0 | 1 | | LSB OUTPUT IS COMP. |
| | 1 | 0 | | LSB OUTPUT IS TRUE |
| | 1 | 1 | | LSB OUTPUT = 1 |

| | $N_7$ | $N_8$ | | |
|---|---|---|---|---|
| | 0 | 0 | | OTHER BITS = 0 |
| | 0 | 1 | | OTHER BITS ARE COMPL. |
| | 1 | 0 | | OTHER BITS ARE TRUE |
| | 1 | 1 | | OTHER BITS = 1 |

| | | $N_9$ | $N_{10}$ | $N_{11}$ | $N_{12}$ | OPERATION |
|---|---|---|---|---|---|---|
| 3. | ADDER | 0 | 0 | 0 | 0 | $A + Z + 1$ } B MUST = 0'S ON OUTPUT |
| | | 0 | 0 | 0 | 1 | $A + Z$ |
| | | 0 | 0 | 1 | 0 | $A + B$ |
| | | 0 | 0 | 1 | 1 | $A + B + 1$ |
| | | 0 | 1 | 0 | 0 | $\bar{A}\bar{B}Z + \bar{A}B\bar{Z}$ |
| | | 0 | 1 | 0 | 1 | $\bar{A}Z + B\bar{Z}$ |
| | | 0 | 1 | 1 | 0 | $A\bar{B} + \bar{A}B$ |
| | | 0 | 1 | 1 | 1 | $A\bar{B}$ |
| | | 1 | 0 | 0 | 0 | $B + Z + 1$ |
| | | 1 | 0 | 0 | 1 | $B + Z$ |
| | | 1 | 0 | 1 | 0 | $\bar{A}B$ |
| | | 1 | 0 | 1 | 1 | $A + B$ |
| | | 1 | 1 | 0 | 0 | $A + B + \bar{Z}$ |
| | | 1 | 1 | 0 | 1 | $AZ + \bar{B}\bar{Z}$ |
| | | 1 | 1 | 1 | 0 | $AZ + BZ + \bar{A}\bar{B}\bar{Z}$ |
| | | 1 | 1 | 1 | 1 | |

| | | $N_{13}$ | $N_{14}$ | | OPERATION |
|---|---|---|---|---|---|
| 4. | Z ADDER INPUT | 0 | 0 | | Z = ALL ZEROS |
| | | 0 | 1 | | Z = CTR FOR MSBYTE, = 0'S FOR ALL OTHERS |
| | | 1 | 0 | | Z = LIT FOR LSBYTE, = 0'S FOR ALL OTHERS |
| | | 1 | 1 | | Z = CENTER BYTES; LSBYTE & MSBYTE = 0'S |

| | | $N_{15}$ | | OPERATION |
|---|---|---|---|---|
| 5. | 8 BIT CARRY INHIBIT | 0 | | ALLOW CARRIES BETWEEN BYTES |
| | | 1 | | INHIBIT CARRIES BETWEEN BYTES |

| | | $N_{16}$ | $N_{17}$ | OPERATION |
|---|---|---|---|---|
| 6. | SHIFT | 0 | 0 | NO SHIFT |
| | | 0 | 1 | RIGHT END-OFF SHIFT |
| | | 1 | 0 | LEFT END-OFF SHIFT |
| | | 1 | 1 | END AROUND SHIFT |

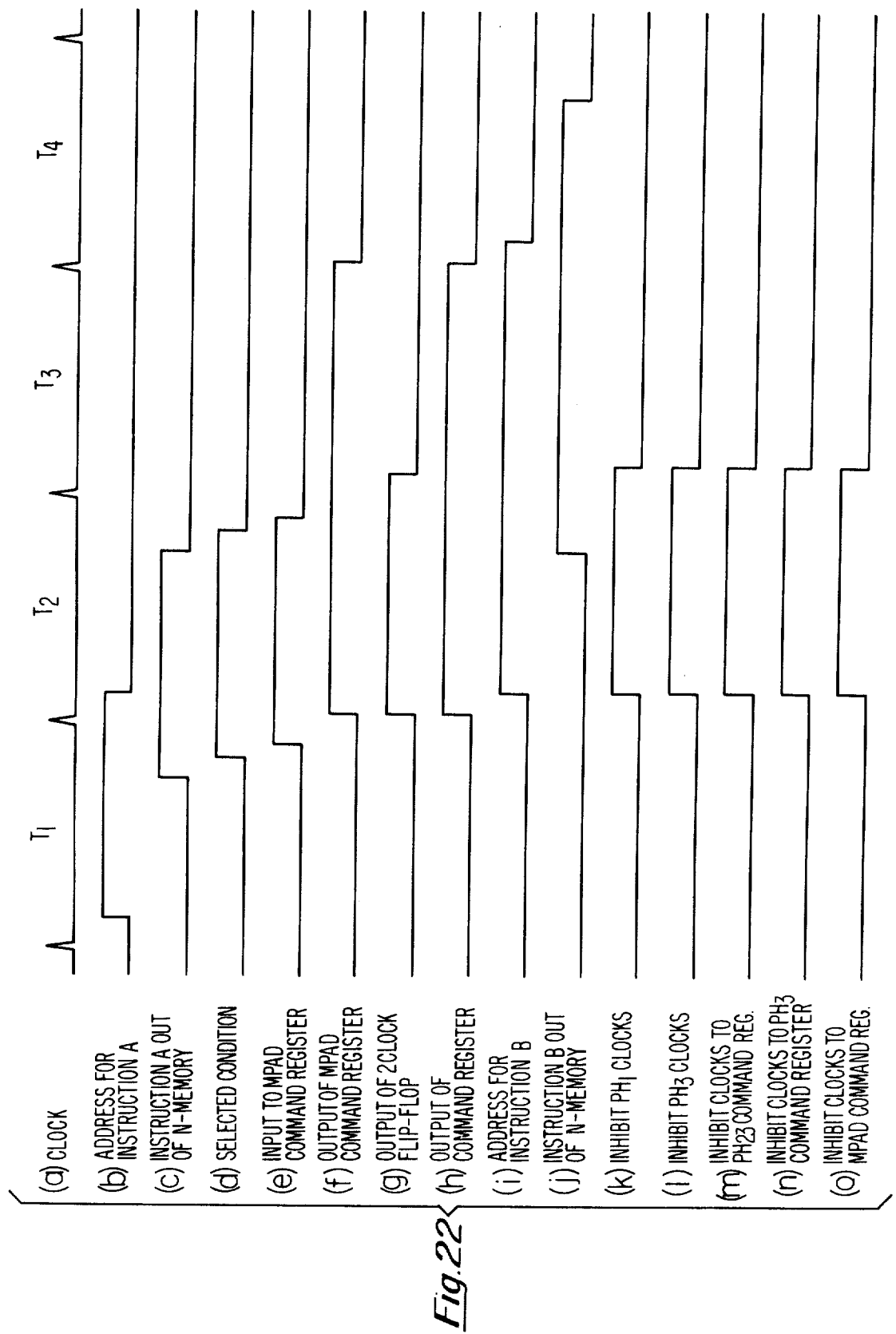

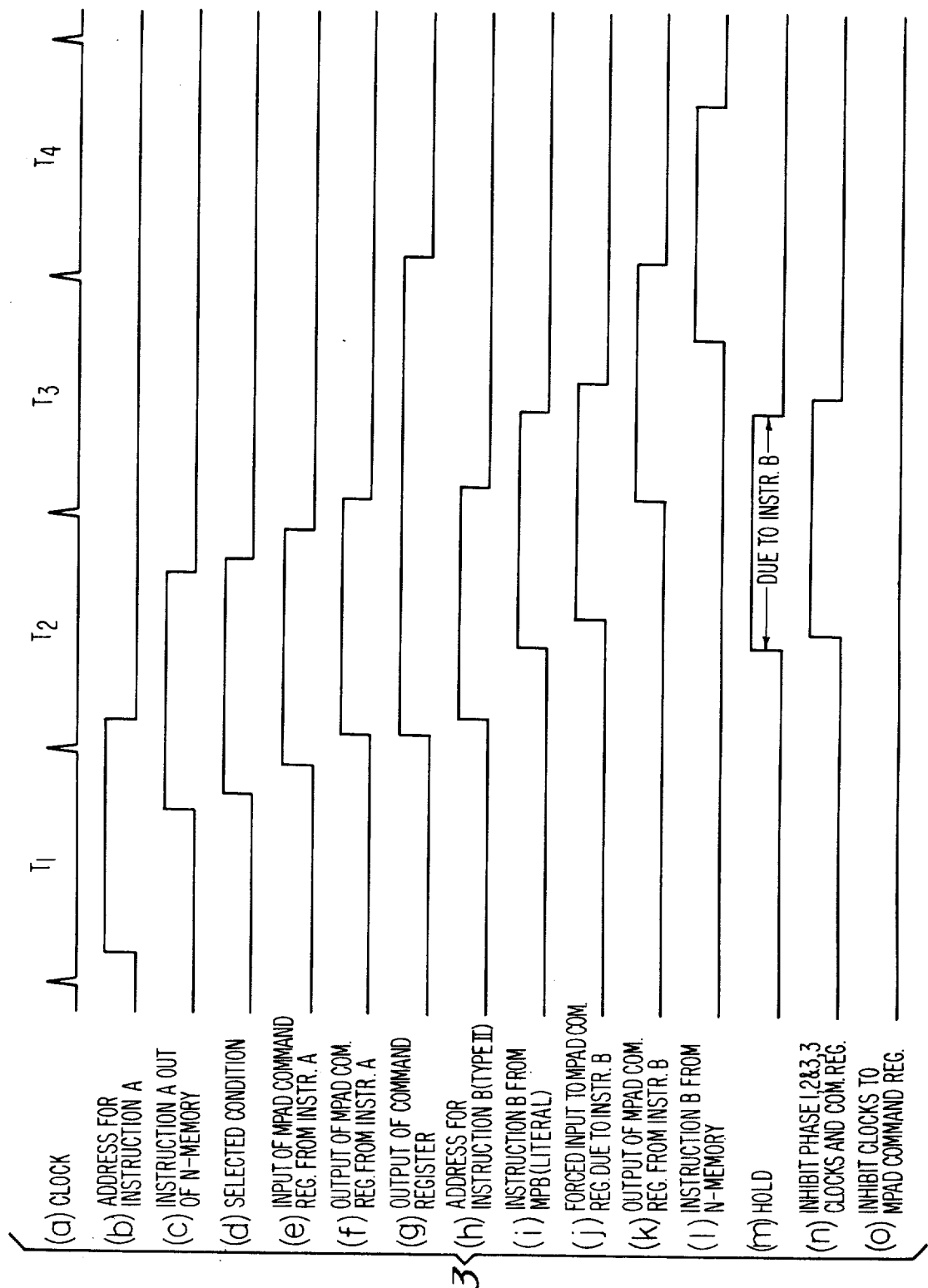

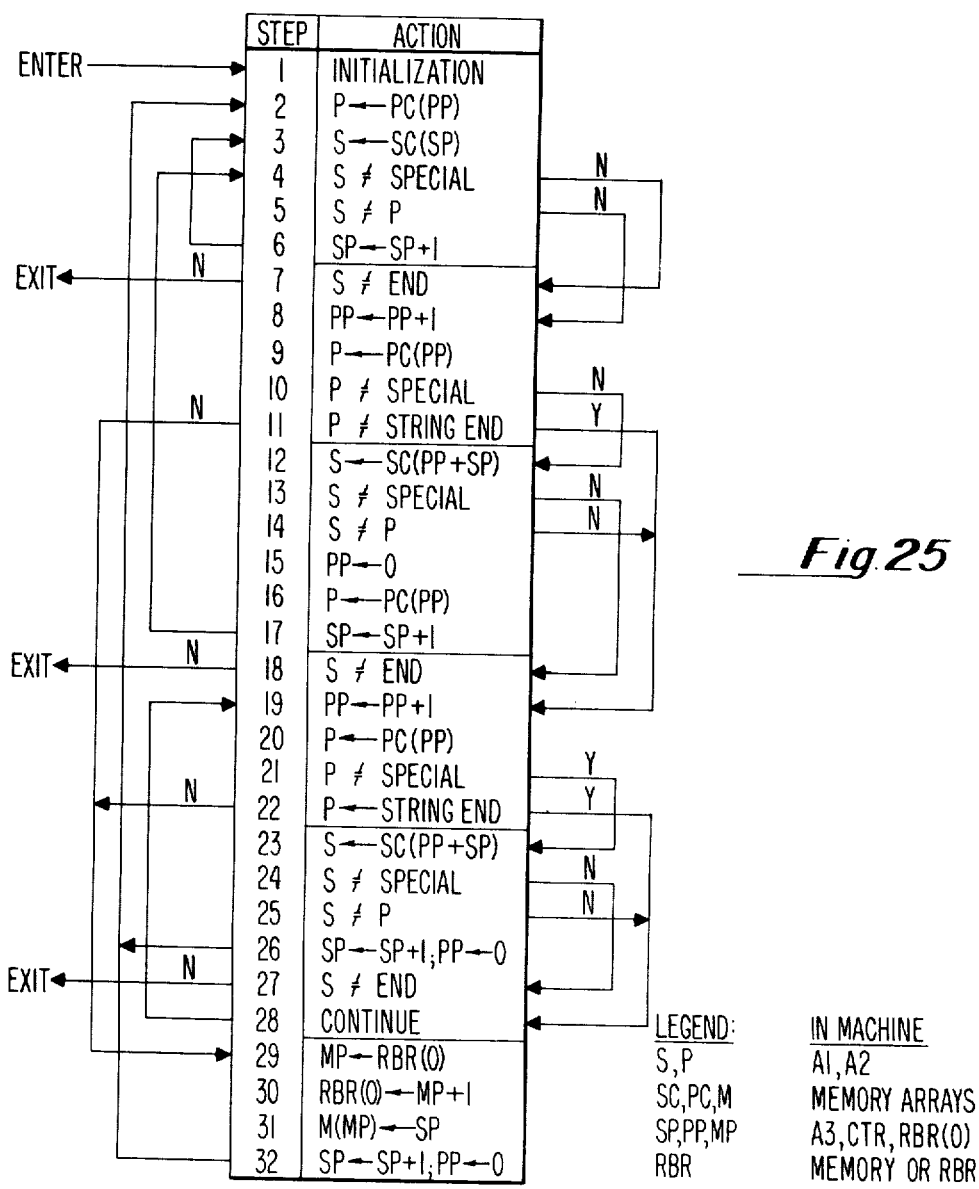

3,983,541

POLYMORPHIC PROGRAMMABLE UNITS EMPLOYING PLURAL LEVELS OF PHASED SUB-INSTRUCTION SETS

This is a division of application Ser. No. 825,569, filed May 19, 1969.

BACKGROUND OF THE INVENTION

This invention relates to a programmable unit adapted to perform different tasks such as computation and other data processing functions and also input-output control. More specifically, this invention relates to such a programmable unit employing plural levels of sub-instruction sets.

Computer usage has expanded to such a large extent that there is now a market for a complete spectrum of computers for performing a great variety of computational tasks and other data processing applications. At one time, the so-called large computer system was thought of as being adapted primarily for complex mathomatical routines and the small data processing systems were thought mathematical as being adapted primarily for business and accounting routines involving rather simple arithmetic operations being performed on a large batch of data. In more recent years, business applications have become of such a magnitude as to require large size data processing systems, and, conversely, applications have been found for medium and small size data processing systems to handle scientific applications as well as data logging. There is, therefore, a need for a variety of computer processing systems ranging from the very small to the very large each of which can handle not only business and scientific applications but also control of data transmission, data acquisition and the like.

As a greater variety of computer applications were found, different systems were individually tailored for those applications. For those situations in which large scale computational problems were involved, requiring many hundreds or thousands of iterative steps, emphasis was placed both on speed of execution and on the number of data bits that could be handled in a given cycle of instruction execution. For such a situation, the system was designed to handle large data widths and also many of the algorithmic processes required to be performed upon that data were implemented directly in wired circuitry to achieve greater speed of instruction execution. It was mainly because of these considerations that the large scale or scientific computer was so expensive. Where the market demanded a more inexpensive computer, such a computer system was designed with the cost factor in mind, as a result of which the circuits and systems involved were relatively simple and the various algorithms were implemented by the programmer. As a result, the time of execution of the program was relatively slow not only because the system had to carry out each individual stop of the program, but also, because the system was designed to handle data of relatively small widths to conserve the circuitry of the system. Since the designer of both types of systems would have to design and manufacture two different arithmetic-logic units for the separate systems, he would lose the economic advantage that would be found with volume production of but one type of design.

The above disadvantage is also inherent in computer systems which are of sufficient size as to require the control of input-output operations concurrently with control of computational and other logic operations. Such separate I-O control units may resemble and, sometimes even are, general purpose digital computers in their own right, complete with an arithmetic unit and sometimes even a local storage. However, the function and, therefore, the design of the I-O control unit still is different from that of the general purpose computer with which it is associated.

Another disadvantage associated with systems of different designs is that of programming incompatibility between the different systems. Since some routeins were implemented in circuitry in larger size systems, only one instruction was required to be executed in order to perform that routine. On the other hand, in a smaller system, a plurality of such instructions would have to be implemented to carry out the same routine. This lack of program compatibility was even more acute between systems built by different companies since different designers employed different instruction formats which varied in length and also employed different field sizes within the instruction format. To overcome such differences in the "machine languages", a variety of different programming languages were developed among the more common of which are Fortran, Cobal and Algol. Programs written in such programming languages could be encoded and used in different computer systems; however, such programs had to first be translated into the machine language of a particular system which translation performed by an executive program sometimes called a compiler, and, if such an executive program had not been provided for a particular programming language, then the computer user would have to rewrite his program in a language for which the system did have a compiler.

Various types of systems architecture have been devised to minimize both the circuit or hardware incompatibility and also the programming or software incompatibility described above. While minimization has occurred within particular product lines, attempts to minimize incompatibility between various programming languages has really only led to the creation of even more programming languages. Particular architectural techniques which have been employed in the prior art include the design of modular processing units and storage units wherein the capability of the system can be increased by adding additional processing units and the storage capacity of the system can be increased by adding storage units. Other techniques include the design of data path widths of different members of a product line to be multiples of some basic unit segment and adapting the instruction format for the product line also to be multiples of that basic segment.

A particular architectural concept that allowed for more flexibility in computer design and also in computer programming has been the concept of microprograms or microinstructions. Initially, a microinstruction was merely a set of control bits employed within a macroinstruction format. Such control bits were employed to provide corrective measures during the execution of a multiply instruction or shift instruction and the like. This concept then evolved to where the macroinstruction specified the particular routine to be performed, such as the addition of two operands, and the execution of the macroinstructions was through a sequence of executions of microinstructions each of which specified the particular gates to be set at the different sequence times. Since a plurality of macroinstructions could be implemented by a finite set of microinstructions, it was recognized that these same microinstructions could be stored in a separate storage to be addressed in any particular sequence upon the execution of different macroinstructions. It was further recognized that various sequences of microinstructions could be formulated to carry out particular operations and separately stored in any memory. Thus, a great variety of sequences of microinstructions could be created to carry out a great variety of routines, and, when a given computer system was designed to perform particular routines, only those required sequences of microinstructions could be stored to be called forth for execution upon the execution of specific individual macroinstructions.

The concept of microinstruction or microprograms, then, became one of sub-instructional sets which were masked or hidden from the programmer thus simplifying the writing of particular programs by minimizing the number of individual specific steps that had to be called for by the programmer. The concept of microprogramming allowed the computer designer to design a more inexpensive computer system that could provide a great variety of routines to the computer user without the requirement of individual functions being implemented in hard-wired circuitry.

While this concept of sequences of microinstructions or sequences of sub-instructions served to provide the programmer with greater ease of program formulation, and also served to provide the computer designer with a greater flexibility and variety of options in meeting the requirements of particular systems architectural design, the obtainment of circuit compatibility between various member systems of a product line and the obtainment of program compatibility both between various programming languages and between the machine languages of the various systems have not yet been provided by the prior art.

OBJECTS OF THE INVENTION

It is, then, an object of the present invention to provide an improved programmable unit the functional capabilities of which may be dynamically changed during the operation of the unit.

It is another object of the present invention to provide an improved programmable unit which may be dynamically changed during its operation to execute programs written in different program languages.

It is still another object of the present invention to provide an improved programmable unit that may be dynamically changed during its operation to execute sequences of computational instructions or to execute sequences of control instructions for input-output data transfers.

It is still another object of the present invention to provide an improved programmable unit that may be dynamically changed from a computational mode to an input-output control mode without the requirement of separate circuitry for each mode.

It is still another object of the present invention to provide an improved programmable unit a plurality of which may be employed in a computation array to provide different computational and data handling operations without any special adaptation being provided to any unit of that array.

It is still a further object of the present invention to provide an improved programmable unit having an expandable number of functional logic units to perform a variety of logic operations under the control of sub-instruction sets.

It is still a futher object of the present invention to provide an improved programmable unit having an architectural design that may be employed in a variety of such units having different computational capacities and capabilities.

SUMMARY OF THE INVENTION

The flexibility provided by microprogramming, that is, the employment of a single level of sub-instruction sets still is not sufficient to achieve the above objects of the present invention. In order to accomplish the above-stated objects, the present invention employs not only a first level of sub-instruction sets which are hereinafter called M instructions but also employs a second level of sub-instruction sets, which are phased, hereinafter called N instructions. The macroinstructions or systems instructions shall be called S instructions. In one sense, the implementation of the phased N instructions may be thought of as a decoder for the M instructions which are encoded rather than being merely control signals. The phased N instructions may be just appropriate combinations of a particular required control signals or may also be encoded signals. Thus, the implementation of a phased second level of sub-instruction sets or N instruction sets provides an additional order of flexibility over that provided by the microprogramming techniques of the prior art.

Since the system of the present invention can perform all algorithms under the control of plural levels of instruction sets, special circuits need not be provided for specific algorithms but only to provide the basic Boolean connectives. Thus, the present invention adapts itself to the employment of multiple identical logic units arranged in parallel fashion which multiple is changable from one computer system to another having a different data path width without any modification of the basic logic unit. This is made possible because of the versatitity achieved by the present invention whereby different algorithms can be implemented by different strings of M instructions, and, thus, the N instructions defining the control signals can be independent of the type of algorithm required to be carried out.

Additionally, the present invention encompasses an array of programmable units individually programmed and identical in form and circuitry each of said units being dynamically changable by changing M instruction sets to operate in a data processing mode or in an input-output control mode.

A feature, then, of the present invention resides in a programmable system and methods with which the system operates wherein provision is made for the storage of different sequences of instructions selected from a first level of sub-instruction sets with the provision further being made for the decoding or implementation of such first level sub-instructions by instructions selected from a second level of sub-instruction sets, the particular sequences of first level sub-instructions being selected or addressed in accordance with the information content of an instruction selected from the higher level set of instructions. A specific feature of the present invention resides in means to address and select the particular second level sub-instructions in an overlapped or phased manner to accommodate the execution of conditional first level sub-instructions during a particular time period.

A particular feature of the present invention resides in a programmable unit and method for operating this unit wherein separate sequences of first level sub-instructions are employed to control the operation of the unit in different modes such as a processing mode and an input-output control mode which sequences can be addressed and selected in accordance with specific higher level instructions.

Another particular feature of the present invention resides in a programmable unit and a method for operating that unit wherein particular different sequences of first level sub-instructions are provided for the execution of higher level instructions expressed in different program language forms which specific sequences of first level sub-instructions can be selected according to the particular language form of the set of the higher level instructions.

Another particular feature of the present invention resides in a programmable unit having arithmetic and logic circuitry formed of a plurality of modular logic units which modular units are activated under the control of two levels of sub-instructions.

DESCRIPTION OF THE DRAWINGS

The above and other objects and advantages and features of the present invention will become more readily apparent from a review of the following specification when taken in conjunction with the drawings wherein:

FIG. 12 is a schematic diagram of the memory interface;

FIGS. 13–16 are representations of the formats of various instructions employed in the present invention;

FIG. 18 is a schematic diagram of the first level sub-instruction decoder;

FIG. 19 is a table of N control signals of the Phase 2 and 3 control fields of the N instruction;

FIG. 20 is a table of N control signals of the Phase 3 control field of the N instruction;

FIGS. 21–23 are sets of timing diagrams illustrating instruction execution overlap; and FIGS. 24 and 25 illustrate M instruction sequences that can be employed in the present invention.

GENERAL DESCRIPTION OF THE SYSTEM

Definitions

Figure 1A:
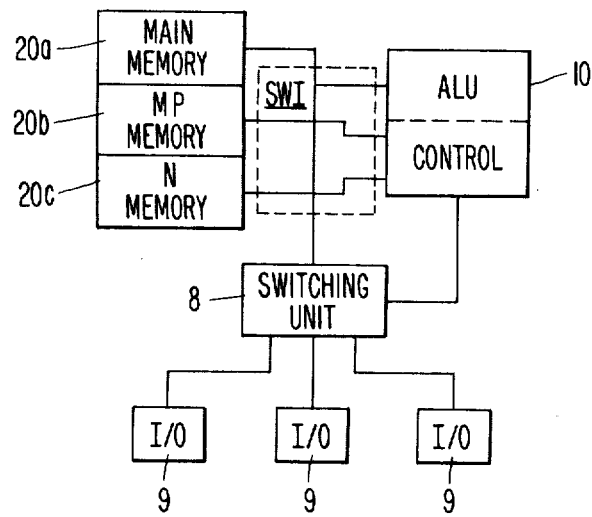
FIG. 1A is a representation of a programmable unit of the present invention.

Certain terms are used frequently throughout the following specification and it will be understood that these terms are to be interpreted in accordance with the following definitions.

Program language form is any format which may be encoded into binary signals which format may be employed by a programmer or computer user without any knowledge of the circuitry in a specific processing system.

S instruction is an instruction containing information specifying a routine or a process to be carried out on data sets. An S instruction is comparable to a macroinstruction or machine language instruction of prior art.

M instruction is an instruction containing information specifying a operation to be carried out in a processing system where one or more such operations are required to carry out a process called for by the S instruction. An M instruction is comparable to a microinstruction employed in the prior art.

N instruction is an instruction containing information specifying particular control signals which are to be employed within the processing system to activate the implementation of an M instruction. One or more N instructions may be required to implement an M instruction.

Prior art concepts of microprogramming provided two basic advantages. First, the programmer is relieved of having to specify the individual steps required to accomplish a given operation which steps are specified by the string of microinstructions called for by the macroinstruction. Secondly, the computer designer is relieved of the requirement of special circuitry to perform each special function to be provided by the system. Furthermore, the designed system an perform a greater number of computational operations with a given instruction format since the operation code of the instruction format is no longer required to specify the particular machine operations.

The present invention employs three separate systems as one single system: namely the S system, the M system and the N system. Each system in turn employs its own memory and its own instruction decoder. The roster of N instructions is normally fixed but may be adapted to be alternable. The roster of M instructions can be changed dynamically alterable. the normal operation of the system. Each unique set of M instructions defines a particular interpretation capability for a particular set of S instructions. Each S instruction may specify a complete algorithm the steps of which are defined by a string of M instructions. The S instruction is the equivalent of the macroinstruction or machine language instruction of the prior art. However, no particular set of S instructions is inherently required by the present invention and, thus, a plurality of different sets of S instructions can be employed including sets of S instructions written according to different programming languages. Furthermore, the set of commands to control input-output data transfer is implemented in the present invention by a particular set of S instructions. Each set of S instructions is interpreted in the system of the present invention by a respective separate set of M instructions each of which is in turn implemented by the roster of N instructions.

The manner in which the present invention is implemented will be better understood from a review of the drawings. Referring first to FIG. 1A, there is illustrated therein the basic arrangement of a programmable unit of the present invention. The programmable unit is formed of two basic sections, namely an arithmetic logic unit or ALU and a control section. Memory 20 is illustrated as being divided into three sections, namely, main memory 20A, microprogram memory 20B and N memory 20C. Main memory 20A will be of the normal destructive readout or DRO type memory normally employed in data processing systems as the storage unit. MP memory 20B is normally of the non-destructive readout type or NDRO type memory. N memory 20C is preferably one of the NDRO type but may be a read only memory type or ROM. All three memories may be of the magnetic thin film type or solid state memory; however, N memory 20C inherently will be chosen to be of the type having the fastest memory cycle. The system of FIG. 1A is completed by a plurality of input-output devices 9 which are coupled to main memory 20A by a switching unit 8 under the control of programmable unit 10.

Figure 1B:
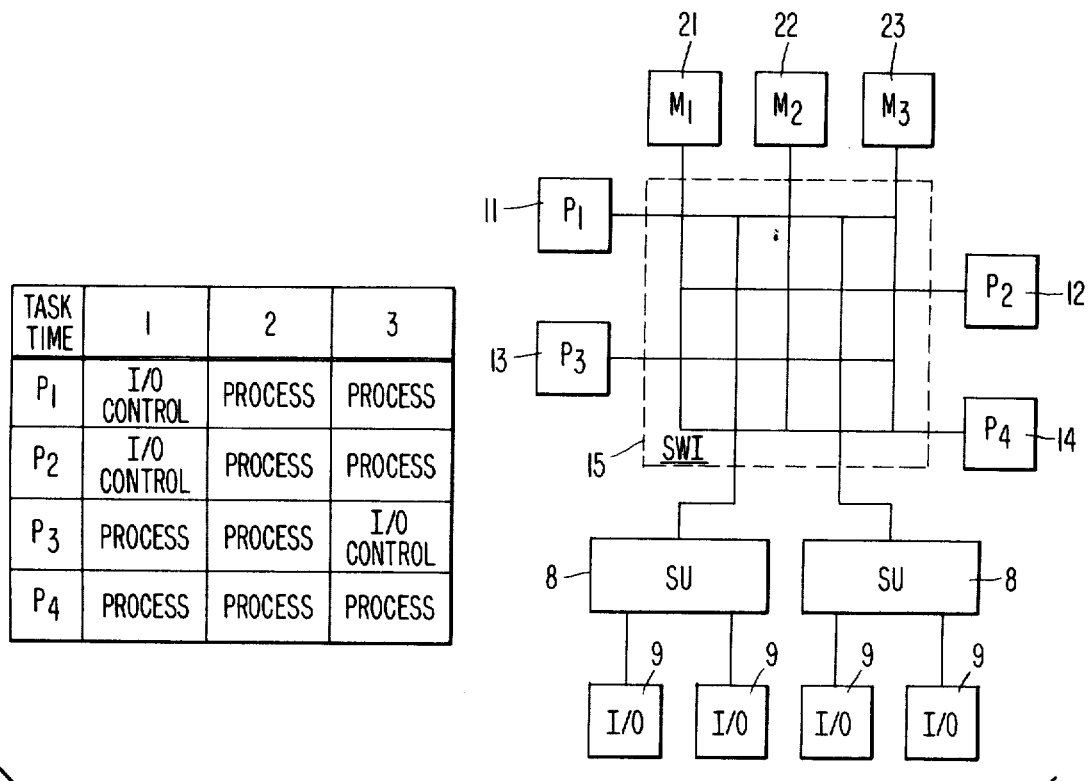
FIG. 1B is a representation of an array of programmable units of the present invention.

Before a detailed description of programmable unit 10 is given, a particular application of such a programmable unit will be described in reference to FIG. 1B to illustrate the versatility of the present invention. In FIG. 1B, a plurality of processor units 11 . . . , 14 are connected in an array through switch interlock 13 which also connects to memory units 21, 22 and 23, as well as to a plurality of input-output devices 9 which are coupled to the array of switching units 8. Such input-output dovices may include magnetic tape transports of the type disclosed in Rayfield et al, U.S. Pat. No. 3,185,365, or such devices may include paper tape readers such as disclosed in Baird et al, U.S. Pat. No. 3,069,078. The respective processor units 11 . . . , 14 are of the type illustrated as processor unit 10 in FIG. 1A and are adapted to be placed in different modes in accordance with the present invention. Thus, as illustrated in the table accompanying FIG. 1B, units 11 and 12 may be placed in an input-output control mode during a particular task time while units 13 and 14 would operate in a process mode. At a later task time when no input-output operations are required, all four units would be placed in a process mode. At a still later task time when further input-output operations are required, one of the units in the array such as unit 13 would be placed in an input-output control mode. The purpose of the table accompanying FIG. 1B is merely to illustrate that any one or all of the processor units can be placed in either an input-output control mode or in a process mode according to the requirements of the application to which the array of FIG. 1B is put.

ARITHMETIC AND CONTROL REGISTERS

Figure 3:
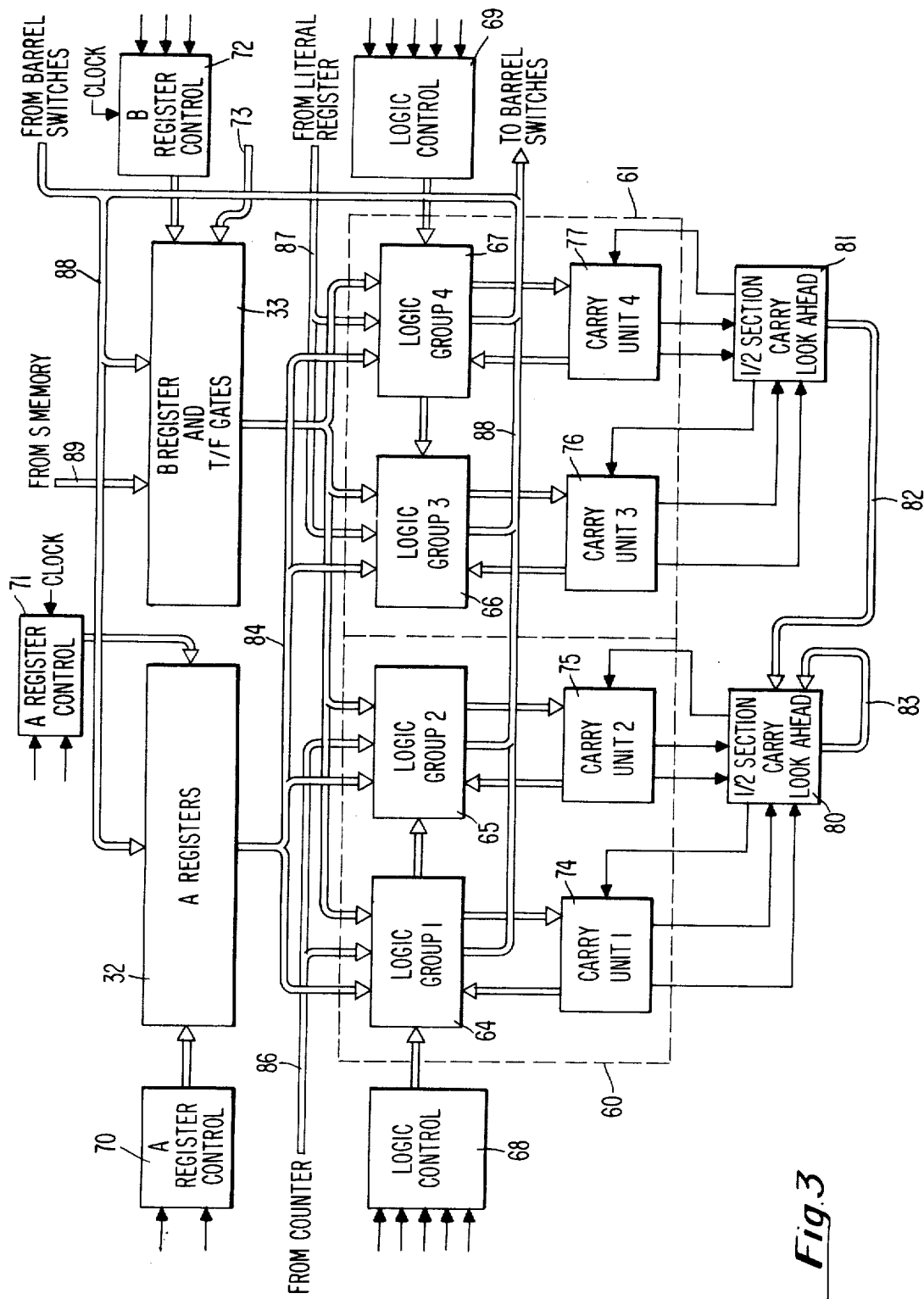
FIG. 3 is a detailed representation of the arithmetic logic unit of the present invention.

Referring now to FIG. 3, the principle registers and data paths of both the control section and the arithmetic logic unit of the programmable unit of the present invention are illustrated. The ALU includes logic unit 31, A registers 32, B register 33 and true-false gates 34.

B register 33 is the primary interface between the programmable unit of the present invention and the main memory. This register also serves as the secondary input to adder 30 and serves certain secondary functions associated with the arithmetic operations.

True-false gates 34 serve to provide the true contents of B registor 33 or to provide the one's complement of the contents of the register 33.

A registers 32 are three functionally identical registers. Each of the A registers is used as a temporary data storage within a ALU and serves as a primary input to adder 30. Each of the A registers is loaded from the output of the barrel switches 31.

The control unit of the programmable unit of the present invention includes three basic sections: namely a section to provide an interface between the ALU and the memory and peripheral devices, a section to handle the decoding of M instructions and a section to receive and route the N instruction control signals.

The output from the ALU is from barrel switches 31 and may be supplied to interface register 48, register base register (RBR) 45 and memory information register (MIR) 47 as well as to the alternate microprogram count register (AMPCR) 41. The output of barrel switches 31 may also be supplied to shift amount register (SAR) 44.

Interface register 48 serves to receive addresses and other information for transfer either to memory address register (MAR) 49 or to counter 30. Register base register (RBR) 43 contains the base address of a 256 word block of main memory. The contents of this register are concatenated with MAR 49 to form an absolute memory address. Associated with RER 43 is Base Register 2 (BR2) 46 which may contain the base address of a 256 word block of main memory or the most significant part of a device address. As in the case of the contents of RBR 45 the contents of BR2 46 are concatenated with the contents of MAR 49 to form an absolute memory address or a device address. Memory information register (MIR) 47 is used to buffer information being written to the main memory or to a device. This register is loaded from the output of barrel switches 31.

The contents of the microinstruction are received by microinstruction decoder 40 to address the H memory and for transfer to literal register 51, shift amount register (SAR) 44 and to alternate microprogram count register (AMPCR) 41. Literal register 51 is used as a temporary storage for literals in the M instructions which are to be used as inputs to adder 30, to counter register 30, or to memory address register 49. The shift amount register 44 holds either the shift amount count or the word length complement thereof to be employed in controlling the number of bits by which data is shifted in barrel switches 31. The alternate microprogram count register 41 contains the jump or return address for program jumps and subroutine returns within M programs. The address in this register is usually one less than the position to be returned to. This register can be loaded from microprogram count register 42, from the barrel switch output or from M instruction decoder 40. In association with this register is the microprogram count register (MPCR) 42 which is the instruction address counter for the M memory. It usually contains the current M instruction address.

The N instruction decode is performed by test logic circuitry 53 and the command register 52. The functions of these latter circuits will be more thoroughly described below. One comment at this point, however, will be that test logic circuit 53 receives information from condition register 54, the contents of this latter register being a set of testable bits which act as error indicators, interrupts, local and global Boolean variables and lockout indicators. These various condition register bits will be thoroughly described below.

OPERATIONS UNDER CONTROL OF M INSTRUCTIONS

Before the formats of the M and N instructions are described, a description of the principle operations to be carried out within the programmable unit will now be given. It will be understood that the operations carried out within the programmable unit are initiated by the M instructions.

MEMORY AND DEVICE OPERATIONS

The memory and device operations are used to transfer data between processor unit and memory or some other device. The processor unit is connected to the memory modules and devices through a switch interlock by bidirectional busses. Memory and device addresses are sent from the processor units memory address register (MAR) to the switch interlock and after connection onto the selected memory or device. Data received from a memory or the device is placed in the B register by designating the B register to the external data bus. Data sent to memory or the device is sent by way of the memory information register (MIR). Each memory or device operation is initiated in the first clock period of the M instruction and continued in parallel with subsequent M instruction executions. Thus, the memory and device operations may be totally overlapped by logic unit operations. The memory, device and set operations, as a group, may be specified as either conditional or unconditional within each M instruction. The specific memory and device operations will be more specifically described below.

LOGIC OPERATIONS

Each M instruction may contain exactly one logic operation. These operations include binary Boolean operations between the A and B and between the B and Z inputs to the ALU, and most of the binary Boolean operations between Z and A. There also are several ternary Boolean operations among all three inputs and true add operations between any pair of inputs. The logical form of the various Boolean operations or Boolean connectives are illustrated in the table of FIG. 20.

The true add operations perform two's complement addition between the A and B inputs to the ALU. The same operations can be made available between B and Z inputs and between Z and A inputs if required. The final carry out of the most significant position of the ALU is available for testing on the next M instruction and also is saved in the overflow bit of the condition register for later testing.

The ALU is formed of a plurality of basic logic units according to the data path width chosen for a particular programmable unit. The number of bits in a basic unit is chosen to be eight. Add operation variance arise from the choice of carrys to each eight bit group. For each eight bit group the logic unit can be wired so that the carry in is either the carry out of the group immediately to the right or a constant. This choice cannot be changed by program. The carry in, however, can be either enabled or inhibited by program. The usual configuration has all but the rightmost eight bit group receiving its carry in from the group to the right. The rightmost groups has a constant one carry in. The carry enables for all but the rightmost group are specified together with the one carry in to the least significant position specified separately.

BARREL SWITCH OPERATION

There are four barrel switch operations that can be specified and one must be specified. These operations are: do not shift, shift right circular the amount in the SAR, shift right end off the amount in the SAR, and shift left end off the two's complement of the amount in the SAR.

Another type of operation which is performed under the control of M instructions are the Set operations which are used to interrupt other programmable units in an array of such units, to lock out and unlock critical sections of such an array, and to set local condition bits. In addition, the M instructions contain various types of information which will be more thoroughly discussed below in relation to the format of the M instruction and other instructions.

INSTRUCTION FORMAT AND CONDITION REGISTER

There are four sources of control information embodied in the programmable unit of the present invention. These include the three levels of instructions, namely, the S instruction, the M instruction and the N instruction and also include a set of conditional bits placed in the condition register 54 as illustrated in FIG. 3. These information sources will now be described.

S INSTRUCTION FORMAT

Referring now to FIG. 13, a type of S instruction format will be described. It is to be understood that no single S instruction format is to be preferred in the present invention. Thus, a variety of instruction formats may be employed, the only requirement being that particular strings of M instructions are provided in the M memory to decode or interpret each particular set of S instructions. It will be further understood that a plurality of such M instruction strings will reside in the M memory.

The particular instruction formats illustrated in FIGS. 13A, 13B and 13C are adapted for the control of input-output data transfers; however, it will be understood that these instruction formats also may be employed to specify routines to be carried out with the programmable unit of the present invention.

The input-output descriptor of FIG. 13 comprises 96 bits arranged in three segments. The operation segment of FIG. 13A is divided into two fields. Field I specifies the operation to be performed while Field II may be employed to specify the address of the peripheral device or the particular memory module to or from which data is to be transferred. Field III of FIG. 13B is a character of 8 bits which may be used as a comparison character to terminate a data transfer. Field IV constitutes a counter which specifies the number of data segments to be transferred and which count is to be decremented by one and tested for zero upon each data transfer. Field V is a set of control bits such as flags which may be used to modify the data transfer or specify various conditions. Field VI is an instruction counter which specifies the absolute address from which the next descriptor operation is to be obtained. Field VII of the Control II segment of FIG. 13C is employed to specify the address in memory to or from which the data is transferred. Field VII may be divided into sub-fields to specify for example, a base address and a relative address position. In the Control II segment, bit 64 is employed to specify that the current channel whose operation is governed by the descriptor is busy, bit 65 is employed to prohibit the current descriptor from initiating a new I-O sequence on another channel and bit 95 is a parity bit.

The instruction formats of FIG. 13, as thus described can be employed to contain information required for a particular channel operation including the provision for addressing a new set of descriptor instructions for initiating a new operation on that channel when the current operation has been completed. While the instruction format of FIG. 13 has been described in relation to an I-O descriptor, this format may also be employed for other routines. In any case, this descriptor format is implemented by the programmable unit of the present invention by the receipt of Field I by the B Register 33 of the arithmetic logic unit of FIG. 3, from which this field is transferred, through adder 30 and barrel switches 31 to the AMPCR 41 so as to serve to address the M memory. At that address, a new address is found and read out to microinstructions decoder 40 of FIG. 3, which address specifies the beginning location of the sequence of M instructions required to implement the S instruction thus decoded.

M INSTRUCTION FORMAT

Having described how an S instruction is decoded to obtain a sequence of M instructions which implement the S instruction, the M instruction formats will now be described in reference to FIG. 14.

Each M instruction requires one sixteen bit word of storage in the microprogram memory or M memory. There are two types of M instructions each of which are differently decoded by the N instructions. The first type of M instructions specify at least one of six functions; a condition, a logic unit operation, a memory or device operation, a true successor, a false successor and literals within the instruction. The condition and successors must be present in every M instruction; however, the other functions are optional, but all options can be included in the same instruction. A second type of M instruction contains only instruction literals.

The first type of M instruction is represented by the format of FIG. 14A. In this format, the zero bit is ONE and the remaining bits specify a N memory address at which may be found the appropriate N instruction which contains the operation and condition control bits specified by this first type M instruction.

The second type of M instruction is represented by the formats of FIGS. 14B and 14C. In FIG. 14C, the first three significant bits are all ZEROS indicating that the remaining bits 3 – 15 are a M memory address to be transferred to AMPCR 41 of FIG. 2. If either of bits 1 and 2 is a ONE and bit zero is a ZERO, then the format is as illustrated in 14B, where bits 3 – 7 represent a SAR content field when bit 3 is a ONE and bits 9 – 13 represent a literal field when bit 2 is a ONE. Bit 8 may be in either the SAR content field or the literal field if both are not specified; however, when bits 2 and 3 are both ONEs, then bit 8 is considered to be a part of the SAR content field.

There are sixteen testable conditions, exactly one of which must be tested for each M instruction. If the test is successful, the entire instruction will be executed and the true successor is taken as the next instruction address. If the test fails only the unconditional portions of the instruction will be executed and the false successor will be taken as the next instruction address. The sixteen conditions which can be tested include the twelve condition register bits and four other conditions which are overflow, exclusive OR, least and most significant bit outputs from the adder on the previous M instruction.

The logic unit operations specified by the M instructions include the selection of the inputs to the adder, the adder operation, the barrel switch operation, and the specification of the destination for the outputs from the adder and barrel switches which destination either may be in the ALU or in the control unit. The controls for the literal, counter, and shift amount register and controls to alter instructions already in progress also are included in this group.

Figure 2:
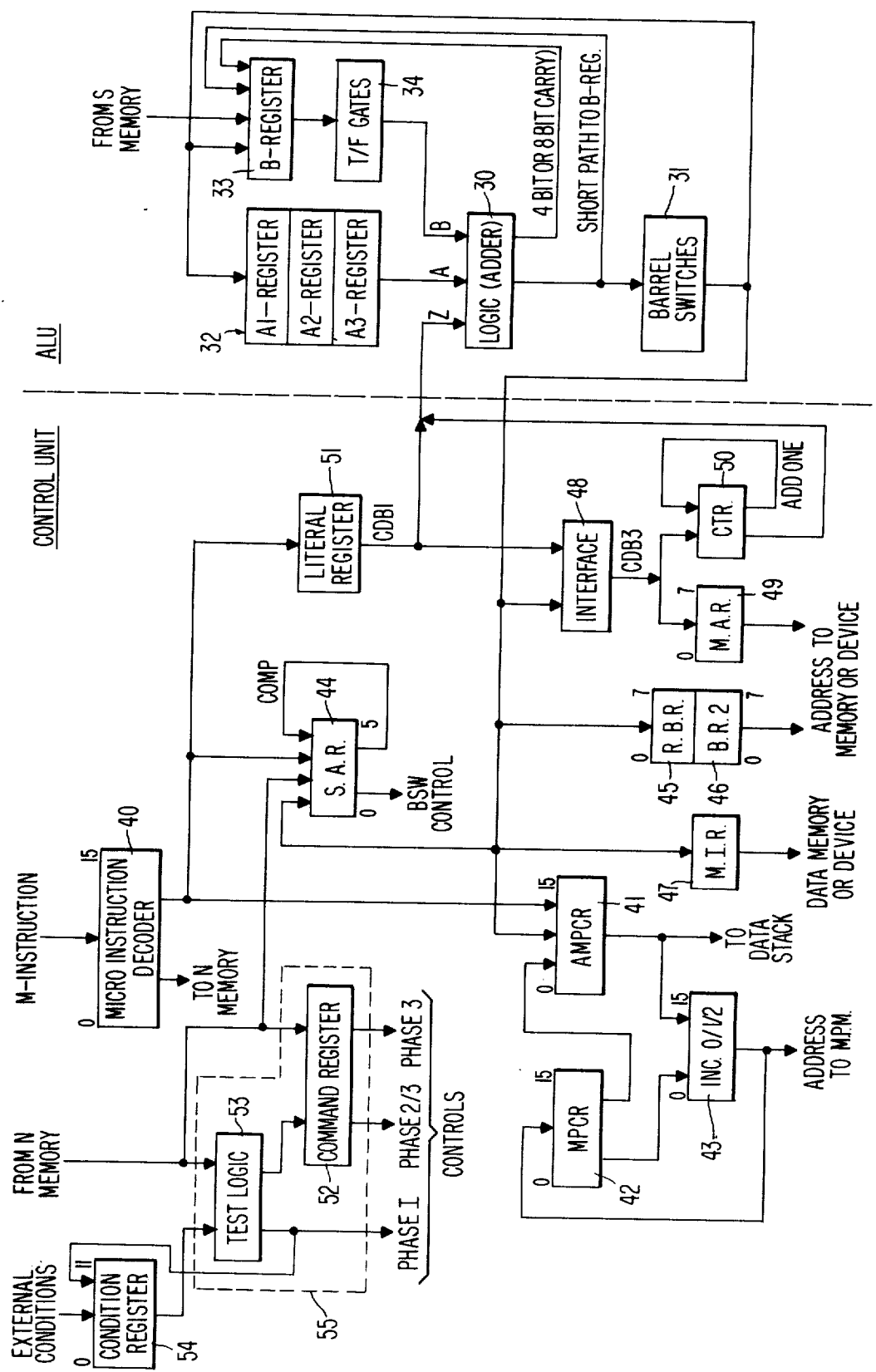
FIG. 2 is a diagrammatic representation of the control portion and the arithmetic logic unit of the present invention.

The specific arithmetic and logic operations, as well as memory and device operations and set operations were discussed above in a section on Operations Under the Control of M Instructions. While these general operations will not be repeated here, there are certain specific functions which are under the control of the M instructions which should be described. Among these are the routing of data segments not only to the A and B registers of the ALU but also to such remote destinations as the AMPCR 41, MIR 47, RBR 45, Counter 50 and MAR 49 as illustrated in FIG. 2. The M instructions also control the transfer of the contents of literal register 51 to Counter Register 50 and incrementation of Counter Register 50. If the incrementation of Counter 50 causes the counter to overflow and reset to all zeros, then the counter overflow bit of condition register 54 is set. These routing functions are performed by addressing appropriate N instructions containing the required control signals.

Within each M instruction, the content of the SAR 44 must be specified as one of the following choices: the same as the content on the previous instruction, the wordlength complement of the content of the previous instruction, the value of the rightmost six bit output from barrel switches 31 on the previous instruction, or a literal value from the M instruction. This specification is acted upon before rather than after the shift takes place in barrel switches 31.

The M instruction also allows for two replace operations which permit partially executed instructions to be modified. These operations depend upon the condition test and include the replacement of the destination or a replacement of the instruction. In the case of a replaced destination operation, a successful condition test allows the previous instruction to be completed, however, if the condition test fails then the current instruction acts a null operation. In the case of a replace instruction operation, if the condition test is successful, then the previous instruction is discontinued after one clock and the current operation is executed; however, if the condition test fails then the current instruction acts as a null operation.

There are twelve memory and device operations any one of which may be initiated by a given M instruction. These operation include: lock to device for read, lock to device for write, unlock the memory or device reserved for reading, unlock the memory or device reserved for writing, read (when a device has already been locked for reading), write (when a device has already been locked for writing), register read, register write, and stack AMPCR in M memory.

As has been indicated above, each M instruction must specify the next M instruction address or successor in the M memory in one of two ways, one for the condition test true and one for the condition test false. If both specifications are the same, then the successor is unconditional. MPCR 42 of FIG. 3 usually contains the address of the current instruction. AMPCR 41 of FIG. 3 usually contains the address of the alternative instruction minus one. There are seven choices for each successor: step to the next instruction in sequence (the next instruction address is the content of MPCR plus one and the MPCR content is replaced by the next instruction address), skip the next instruction (this operation permits one instruction conditional branch within an explicity adder specification; the next instruction address is the content of the MPCR plus two and the MPCR content is replaced by the next instruction address), repeat the instruction again (this operation permits the repeated execution until the value of a condition changes; the next instruction address is the content of the MPCR which remains unchanged), save loop address (this causes the address of the current instruction to be saved in the AMPCR so that jumps can later be made to the current instruction address plus one), execute an instruction out of sequence (this operation permits the instruction specified in AMPCR to be executed with immediate return to the normal sequencing), call a procedure (this operation causes a jump to a routine specified in AMPCR with the current position saved for later return), and jump (this operation permits transfer of control to the instruction specified in AMPCR).

There are three literals which may occur in the M instructions: M instruction addresses, data literals and shift amounts, For type one instructions, no additional time above the logic unit time is required to process the literals. For type two instructions comprised entirely of literals, no more than one clock is required. The M instruction address literals are those addresses requiring a full M instruction work which therefore, cannot be used with type one instructions or with other literals. Data literals may be used in type two instructions either alone or together with a shift amount. The data literal is loaded into the literal register 51 of FIG. 3 before any logic unit operation in the instruction is performed. The shift amount literals are loaded into SAR 44 of FIG. 3 before any logic unit operation in the instruction is performed.

CONDITION BITS

As indicated above, one of the four sources of information in the programmable unit of the present invention are those external condition signals supplied to condition register 54 of FIG. 3. Since these condition bits affect the implementation of M instructions by the N instructions, the respective conditions represented by these bits will be described before a description is given of the format of the N instructions.

As has been indicated above, the condition register is the set of twelve testable bits which act as error indicators, interrupts, local and global Boolean variables, and lockout indicators. The format of the condition register is illustrated in FIG. 16.

Counter overflow bit (COV) is a bit which is used to remember overflows from counter register 50 of FIG. 3. This bit is set whenever an increment counter operation causes the counter to reset to all zeros. The bit is reset whenever it is tested. It is also reset whenever the counter register is loaded from either the barrel switch output or literal register 51 of FIG. 3. If it is set and reset in the same clock period, the reset will dominate. Any test on this bit actually tests the "logical OR" of this bit with the true overflow from the counter.

Read complete bit (RCC) is a bit which indicates that data is available to the clocked into the B registor. This bit is set by the memory module or the device to which the programmable unit is read connected. All devices will set this bit. The read complete bit is reset by testing.

Memory address register ready bit (MAR) is a bit which is used to indicate that the MAR may be reloaded. It is set by the switch interlock or a device during a lock, read or write operation. The bit is reset by testing. As long as the bit remains reset after the above operations are initiated, it indicates that the device or memory module is busy.

Error in device or memory module for read (ERR) is a bit which indicates that an error has been detected in the memory module or device attached to the programmable unit for a read operation. The bit is set by the device or switch interlock and reset by testing. The bit represents the logical OR of all error signals from the device which require immediate attention. This includes memory parity errors, invalid addresses in peripheral memories, device or memory not connected (a signal from the switch interlock), and power failure in the device. Conditions, such as "high speed printer out of paper" warning, are not included (some types of device errors go only to the display).

Error in device or memory module for write (ERW) is a bit which acts like ERR except that it is associated with the memory module or device attached to this programmable unit for a write operation.

First external request bit (EX1) is a bit which indicates a new request from an external device or another programmable unit. Such requests could normally be serviced by any programmable unit. The bit is simultaneously set in all programmable units by the device. It is reset locally within each programmable unit by testing.

Second external request bit (EX2) is a bit which indicates a request from a device which is busy but not locked to any programmable unit. Indications would include such conditions as "tape-up-to-speed" from a magnetic tape unit. In this case only the programmable unit which initiated the tape operation would be expecting a return.

MIR ready bit (MIR) indicates data received by memory or a device after a write operation. This bit is reset locally within each programmable unit by testing.

First global condition bit (GC1) is a bit which when set indicates a successfully perfomed lockout. The bit can be set in at most one programmable unit at a time. It is set and reset locally within each programmable unit. Testing this bit does not reset it.

Second global condition bit (GC2) provides a similar function as does the first global condition bit (GC1).

First local condition bit (LC1) is a bit which is used for temporary storage of Boolean conditions within a programmable unit. It is set locally by the programmable unit and reset locally by testing.

Second local condition bit (LC2) is similar to the first local condition bit (LC1). The specific assignments for the condition bit can be changed for special purpose systems. With the exception of the global conditions bits, all bits are identical except for their external connections. Only three (MIR, LC1, LC2), however, can be set locally.

N INSTRUCTION FORMAT

Referring now to FIG. 15, the N instruction format will be described. This format is comprised of various control signals required to implement the M instructions which have been described above. It will be understood that the N instruction format comprises control signals, which signals are now generated directly by circuitry but are stored in an instruction form in the N memory to be retrieved as required which retrieval is in accordance with the N memory address contained in a type one M instruction. While the preferred embodiment of the present invention utilizes the various bits of the N instruction directly as control signals, it is within the scope of the present invention that the various bits of the N instruction can be in encoded forms the various combinations of which will designate the generation of the appropriately required control signals.

As indicated in FIG. 15, an implementation of an M instruction occurs during three time phases. Thus, the control signals designated by the N instruction are segregated into three groups: namely those required to be employed during phase 1, those required to be employed during phases 2 and 3, and those required to be employed during phase 3.

The timing relationship between the various phases will be more thoroughly described below in relation to certain timing waveforms; however, these phases will now be generally dscribed to the extent that such description lends better understanding to the various control signals comprised in the N instruction format of FIG. 15.

As indicated above there are three timing phases and also there are two types of M instructions. Type one instructions will always have have phase 1 and phase 3 control signals, and in some cases may have phase 2 control signals. Type two instructions have only phase 1 control signals. The phase 1 control signals of type two instructions are applied to load the literals to AMPCR, LIT, or SAR as specified. Type two M instructions always require one clock time and always overlap phase 2 of the preceding type one instructions.

Phase 1 occurs in every type one instruction and requires one clock time. It always overlaps phase 3 of the preceding type one instruction (there may be intervening type two instructions). Phase 1 is used for condition testing, next instruction address computation, initiation of memory and device operations, loading instruction literals into the LIT or SAR, and setting up for a logic unit operation.

Phase 2 occurs in some type one M instructions and requires a variable number of clock times. It is used to delay phase 3 for carry propagation, instruction buffering, instruction modification, and type two M instruction execution. When the next M instruction is type two, the current type one M instruction is held in phase 2 for one clock time while the type two M instruction is performed. Phase 3 occurs with every type one M instruction and requires one clock time. It is always phase 1 of the next type one M instruction (there may be intervening type two instructions). Phase 3 is used to perform the logic unit operations including destination selection.

The various control signals of the N instructions may be divided into five groups depending on the phase in which they are executed.

CONTROLS USED ONLY IN PHASE 1

These controls are executed directly from the M instruction. The condition testing, conditional-unconditional specifications, replace operations, successor operations, initiation of memory or device operations, condition bit setting SAR specifications comprise this group.

CONTROLS USED IN PHASE 2

Only the logic unit operations (excluding destination selection) are performed in phase 2. Depending on the width of a true add operation, the clock rate of the programmable unit and whether the barrel switch output is required, two rather than one clock times may be required to complete the logic unit operation. In such cases, a one-clock-time phase 2 is included. The need for the addition of time is explicitly indicated in the instruction during the duration control.

When the fetching of the next instruction from the M memory is delayed, the type one instruction currently being exectued (there always is one) remains in phase 2 until the fetch can be made. The need for the duration of this delay is not determinable by the programmer and is indicated dynamically by the microprogram buffer or the M memory.

When the next M instruction contains a replace operation the current type one instruction is held in phase 2 for one clock time to permit execution of phase 1 of the replace operation. The need for this delay is determined by the replace controls in the next instruction.

CONTROLS USED IN BOTH PHASE 2 AND PHASE 3

These controls are executed from the command register. This group is concerned with only the logic unit operation and consists of the A register selection, the B register selection, the C input selection, the adder operation and barrel switch operation.

CONTROLS USED ONLY IN PHASE 3

These controls are executed from the command register. This group is comprised of the A register destination, the B register destination, the remote destination, and the literal transfer and counter operations.

The literals in the M instructions are loaded into the specified register (AMPCR, SAR, or LIT) during the first clock of the instruction. For type one instructions, this is phase 1; for type two instructions this is phase 2 of the type one instruction then being executed.

A table of the more important control bits (or signals) which are included in the N instruction format are presented in FIG. 20 along with a list of their functions.

External Controls set the condition register bits and are initiated by external devices, memories and other programmable units.

The specific individual control signals will be more thoroughly described below in relation to the various circuits to which those control signals are supplied.

DETAILED DESCRIPTION OF SPECIFIC CIRCUITS

In FIG. 3, there is presented a diagrammatic representation of the ALU of the present invention which is a more detailed representation then was generally provided in FIG. 2. It will be remembered that a feature of the present invention is the provision of arithmetic and logic circuitry formed of a plurality of modular logic units. The circuitry of FIG. 3 includes a logic system arranged in what will be called a section comprised of two half sections 60 and 61. Each half section is adapted to receive, in parallel, data segments of eight bits. Thus, the logic section illustrated in FIG. 3 is adapted to receive data segments of sixteen bits. As further illustrated in FIG. 3, each logic half section 60 and 61 is respectively under the control of logic controls 68 and 69 which in turn are activated by control signals received from N decoder 55 of the control portion of the programmable unit as illustrated in FIG. 2.

Logic half section 60 includes logic groups 64 and 65 as well as carry units 74 and 75. Similarly, logic half section 61 includes logic groups 66 and 67 as well as carry units 76 and 77. Each logic group is adapted to receive input data segments of four bits. As illustrated in FIG. 3, each carry unit performs a carry look-ahead function for its corresponding logic group. In addition, the carry-look-ahead function for each half section 60 and 61 is provided by carry look-ahead half sections 80 and 81, respectively.

The remaining portion of the ALU illustrated in FIG. 3 includes A registers 32 and the B register (and true-false gates) 33. The A registers 32 can be set under the control of A register controls 70 and 71 and the B register is under the control of B register control 72. The true-false gates which will be discussed below are under the control of signals received from the control portion of the system by way of control bus 73 as illustrated in FIG. 3.

Where appropriate, the same numerals have been employed in both FIGS. 2 and 3 to identify those registers appearing in both figures.

Figure 4:
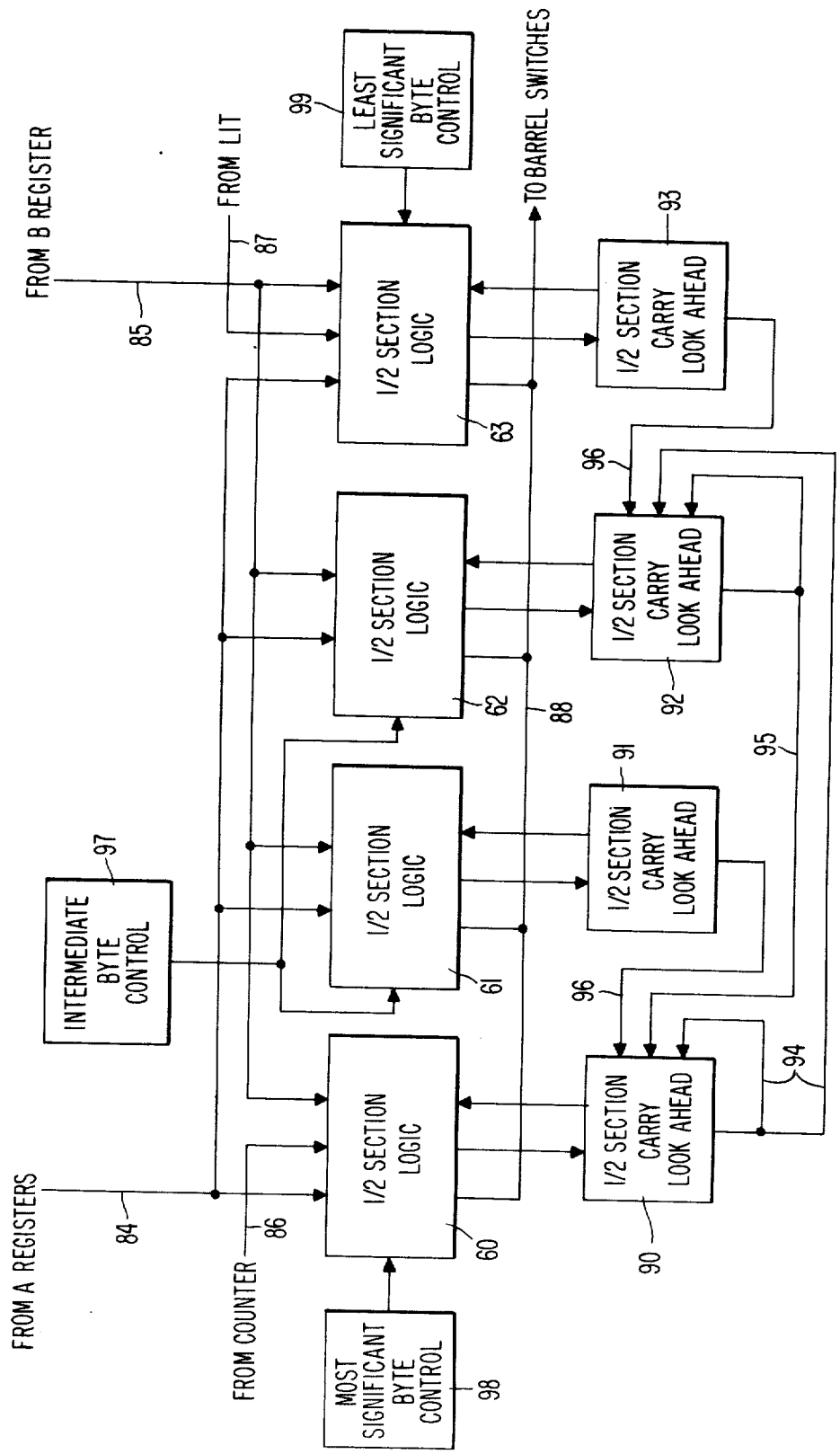
FIG. 4 is an alternative representation of the arithmetic logic unit.

Referring now to FIG. 4, an alternative ALU will be described which is formed of two logic sections or four half logic sections. With this format, the ALU can receive data segments of thirty-two bits. As with the embodiment illustrated with FIG. 3, each of the logic half sections 60 . . . , 63 has associated with it the respective half section carry look-ahead 90 . . . , 93. The interconnection between the various look-ahead half sections differ from that of the embodiment of FIG. 3 in a manner which will now be briefly described. Each half section look-ahead receives group signals from the two carry units in the corresponding logic half section as illustrated in FIG. 3, and returns group carry signals to those carry units. In addition, each half section carry look-ahead generates section transmit and section generate signals which are sent to each half section carry look-ahead in the system which is the most significant one of each pair of half section carry look-aheads. Thus, in FIG. 4, the most significant of each pair of carry look-ahead half sections are carry look-ahead 90 and 92, while the respective carry look-aheads 91 and 93 are the least significant of the pair in which they reside. Conversely, the least significant of each pair will generate groups signals which are transmitted to the most significant of that pair. As indicated in FIG. 4, the section signals generated by the most significant one of the pair are transmitted to the other most significant ones of the pairs by connection 94 and 95 while the group carries between half sections are transmitted from the least significant ones of the pair to the most significant ones of that pair by connections 96. In FIG. 3, where only one pair of half sections has been employed, the group signals transmitted between half sections are again transmitted by way of connection 82 from the least significant one of the pair to the most significant one. As further illustrated in FIG. 3, the section carry signals are really employed by the half section carry look-ahead which generates those signals.

Other distinctions exist between the different embodiments respectively shown in FIGS. 3 and 4. One is the manner in which the different control signals are employed to activate different logic half sections. In the embodiment of FIG. 3 each logic half section is provided with its own logic control unit and thus each logic half section can be separately employed. In the embodiment of FIG. 4, the most significant half section 60 and the least significant logic half section 63 are each provided with separate controls 98 and 99, respectively. The intermediate half logic sections 61 and 62 are provided with the same sets of control signals from the intermediate control 97. Each of the respective logic controls are activated in response to control signals received from the control portion of the system in accordance with the format of the respective N instructions, as will be more thoroughly discussed below.

As indicated in FIG. 2, the adder or logic is also provided with a third input namely a Z input. As indicated in both FIGS. 3 and 4, the X inputs are the contents received from counter register 50 of FIG. 2 which contents are supplied to the most significant logic half section and the contents received from literal register 51 of FIG. 2 which contents are supplied to the least significant logic half section.

Figure 5:
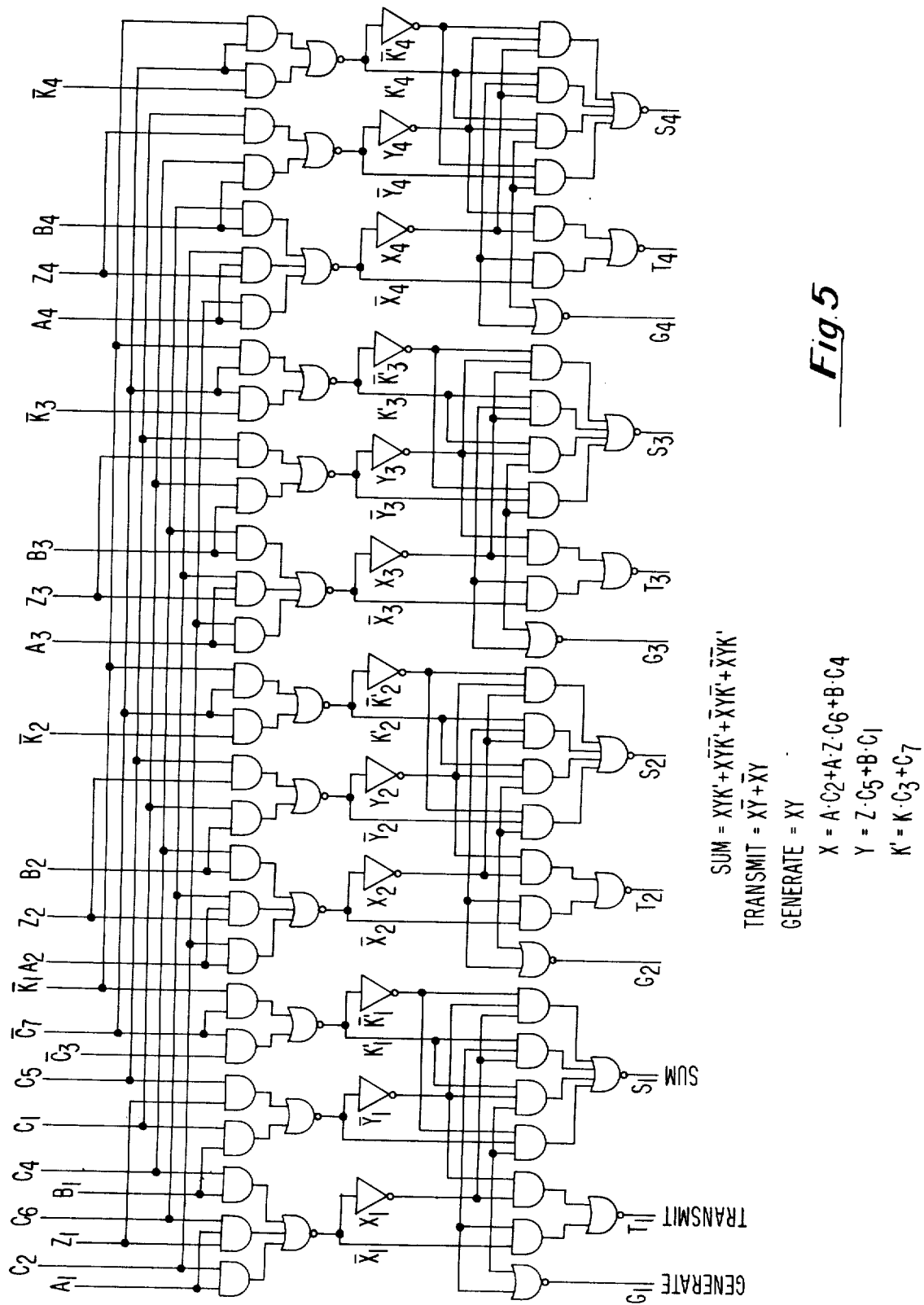
FIGS. 5–11 are schematic diagrams of various logic circuitry of the present invention.

The logic groups are represented in FIG. 3 and implied in FIG. 4 are identical. The circuitry of an individual logic group is illustrated in FIG. 5 and will now be described. In essence, the circuit of FIG. 5 comprises a plurality of AND gates and NOR gates. It will be noted that circuitry of FIG. 5 can be divided into four sets of circuits each of which is adapted to receive inputs of data bits of different significant levels and also to receive the respective control signals $C_1 \ldots C_7$. The intermediate outputs X, Y, K' and their complements are received from the first level of gates and are supplied to the second level of such gates to provide a generate signal, transmit signal and sum signal for each of the four significant bit sections. The respective Boolean equations implemented by the circuitry of FIG. 5 are listed in FIG. 5.

The A input signals are those signals which are received from the A registers as will be more thoroughly described below. The B signals are those signals received from the B register or their complements. The Z inputs are those inputs received either from counter 50 or literal register 51 of the control portion of programmable unit as illustrated in FIG. 2. The inverse carry signals $\overline{K}$ received from the respective carry look-ahead circuits which will be more thoroughly described below. The respective S signals are the logic output signals which are supplied either to barrel switches 31 or to B register 33 as indicated in FIG. 2. The G signals and T signals are signals which are supplied to the respective carry look-ahead circuits that, in turn, generate the $\overline{K}$ carry signals described above.

It will be understood that the S output signals will represent different Boolean expressions in accordance to the particular selected control signals $C_1 \ldots \overline{C_7}$ presented to the logic group of FIG. 5 in response to presentation of N signals to logic controls 68 and 69 of FIG. 3. The N signals are received from N Decoder 55 of FIG. 2 and implement a pre-given N instruction.

Figure 6:
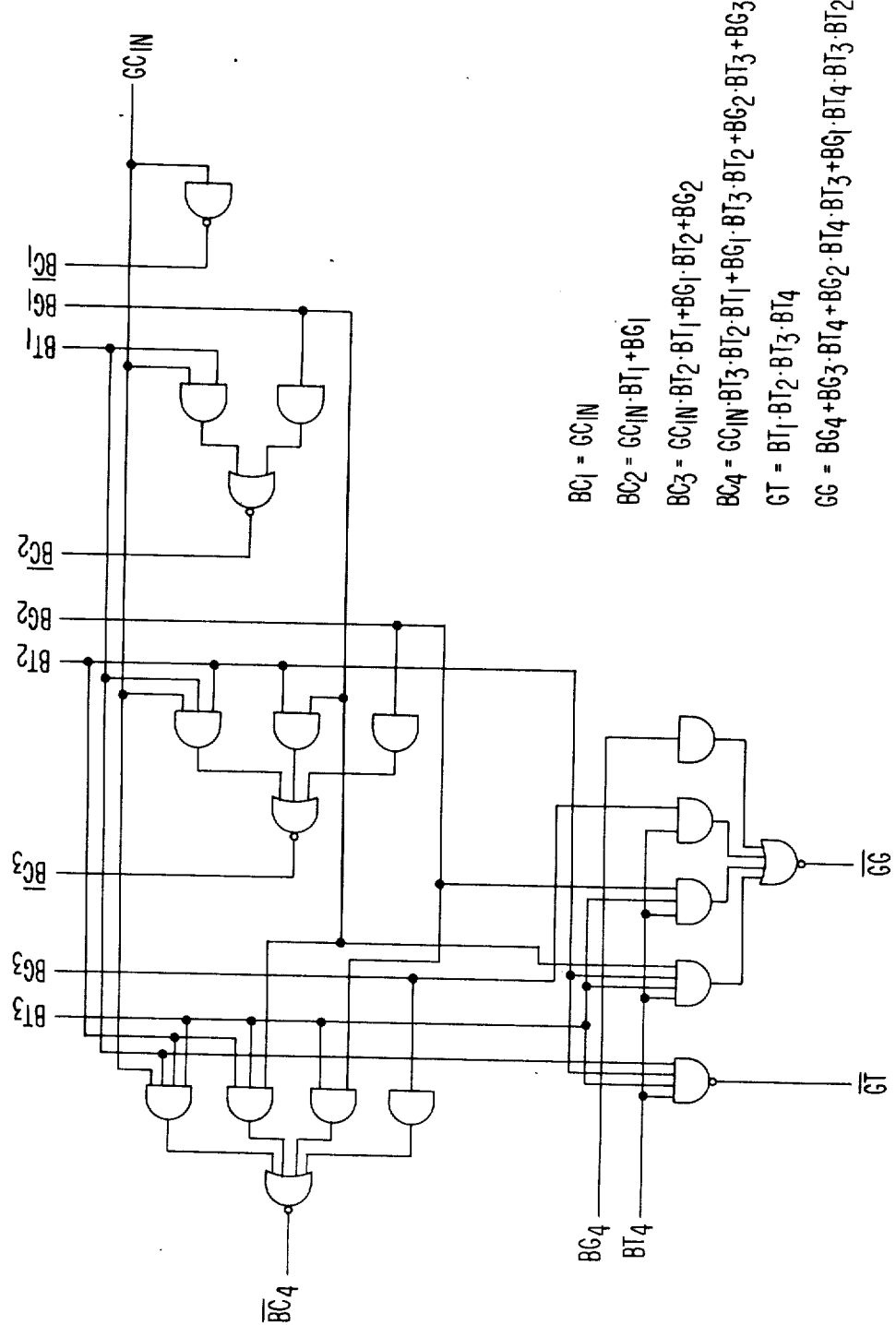

It will be appreciated from a review of FIG. 5 that each significant bit section of the logic group illustrated in that FIGURE must receive a carry signal from the previous section and apply the carry signal to the next section in order. The group carry look-ahead circuitry which provides these signals is illustrated in FIG. 6, which will now be described. The circuitry is adapted to receive a carry signal GC in from the next least significant logic group by way of the half section carry look-ahead circuitry that will be described below. This circuitry also receives the various bit transmit signals BT and bit generate signals BG from the respective sections of its associated logic group. The generation of these signals was described in relation to FIG. 5. Upon receipt of these signals the circuitry of FIG. 6 in turn, generates the appropriate inverse carry signals $\overline{BC}$ which are supplied to the various sections of the associated logic group as the carry signals $\overline{K}$ as indicated in FIG. 5. As further illustrated in FIG. 6, this circuitry also generates the inverse group transverse signal $\overline{GT}$ and the inverse group generate signal $\overline{GG}$ which signals are supplied to the carry look-ahead half section as has been indicated in FIG. 3 and which will be more thoroughly described below. The respective Boolean equations representing the functions implemented by the circuitry of FIG. 6 are illustrated in FIG. 6. The circuitry of FIG. 6 is just that circuitry of the respective carry units 74 . . . , 77 which are illustrated in FIG. 3.

Figure 7:
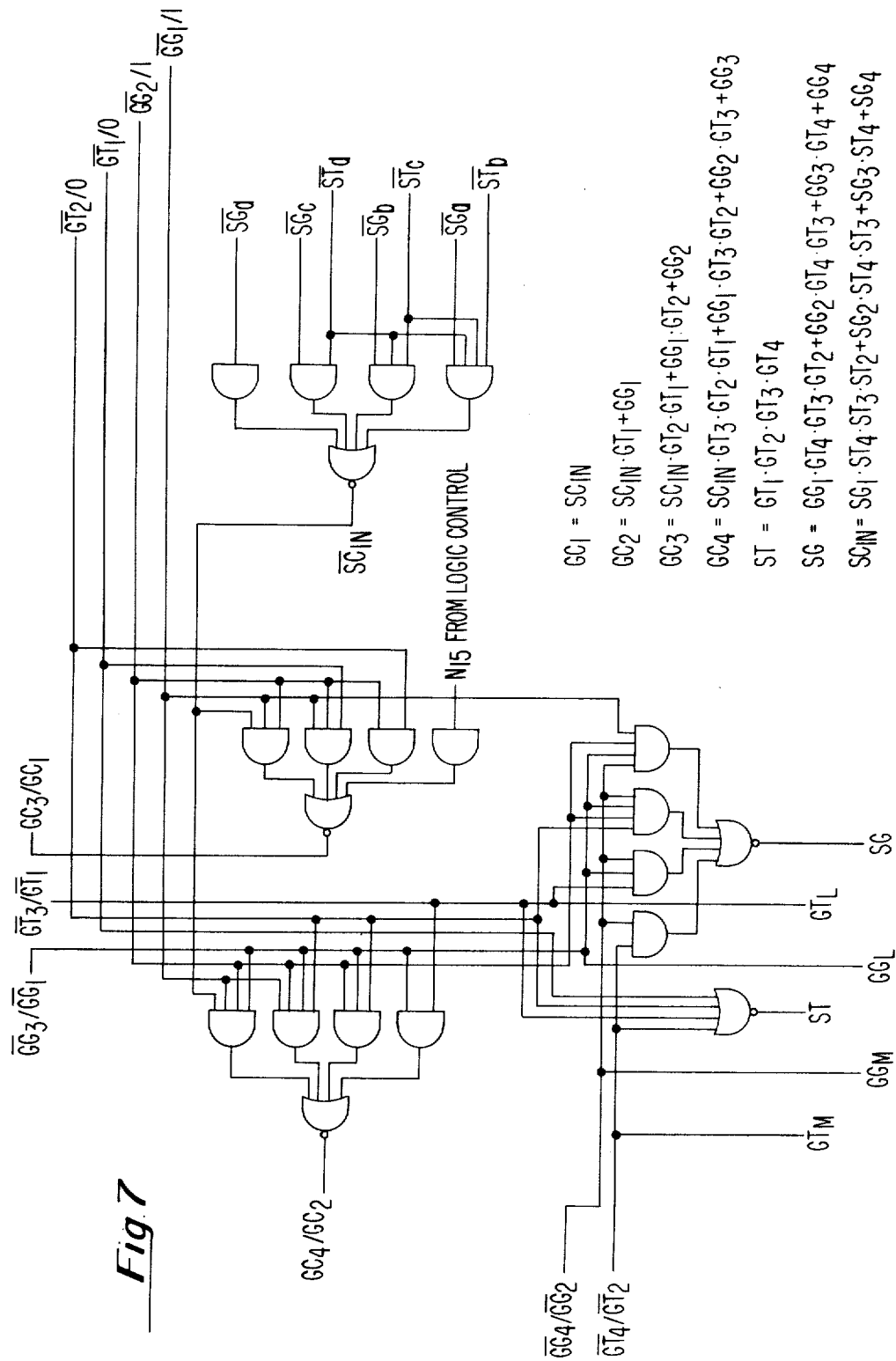

The carry look-ahead half sections 80 and 81 as illustrated in FIG. 3 and 90 . . . , 93 as illustrated in FIG. 4 are shown in detail in FIG. 7 which will now be described. As indicated in FIGS. 3 and 4, each half section carry look-ahead will receive or not receive signals from the next least significant half section carry look-ahead, depending upon whether it is the most significant or least significant half section carry look-ahead of the logic section of which it is a part. Conversely, each half section carry look-ahead will transmit different types of signals to the other carry look-ahead half sections depending upon its place in the hierarchial order. The circuit of FIG. 7 is adapted to receive and supply the various required signals regardless of its order in the hierarchy. Therefore, certain connective leads as illustrated in FIG. 7, will or will not be required. Thus, the circuit of FIG. 7 is adapted to receive inverse group generate signals $\overline{GG}$ which are represented as having odd numbered subscripts when they come from a less significant group of carry units and are presented to have even subscripts when they come from a more significant group carry unit. The circuit is also adapted to receive inverse group transmit signals $\overline{GT}$ which are also provided with odd and even numbered subscripts in accordance with the convention just described. In return, the circuit of FIG. 7 generates group carry signals GC which are also provided with odd or even numbered subscripts depending on their significance, these signals being supplied to the respective group carry units as illustrated in FIG. 3. When the half section carry look-ahead is a less significant one, it is adapted to supply the next most significant one with the group transmit signals GT and group generate signals GG. When the circuit is a most significant half section look-ahead it supplies the respective section transmit signals ST and section generate signals SG to all the more significant carry look-ahead half sections of the ALU as indicated in FIG. 4. Accordingly, the circuit of FIG. 7 is also adapted to receive such section generate and section transmit signals from the other most significant carry look-ahead half sections to form an inverse section carry in signal $\overline{SC}_{in}$. It will be understood that this latter function will not be provided when the circuit is a less significant half section carry look-ahead. Similarly, the circuit will not be sensitive to group transmit and group generate signals from the next less significant half section carry look-ahead and, in this situation, the respective input leads provided for this function will have ZERO or ONE binary signals permanently forced upon them as indicated in FIG. 7.

It will be noted that the generation of group carry signals to the least significant bit positions of each logic half section can be inhibited by a control signals $N_{15}$ received from respective logic control 68 or 69 of FIG. 3.

The respective Boolean equations representing the functions implemented by the circuit of FIG. 7 are listed in FIG. 7.

Figure 8:
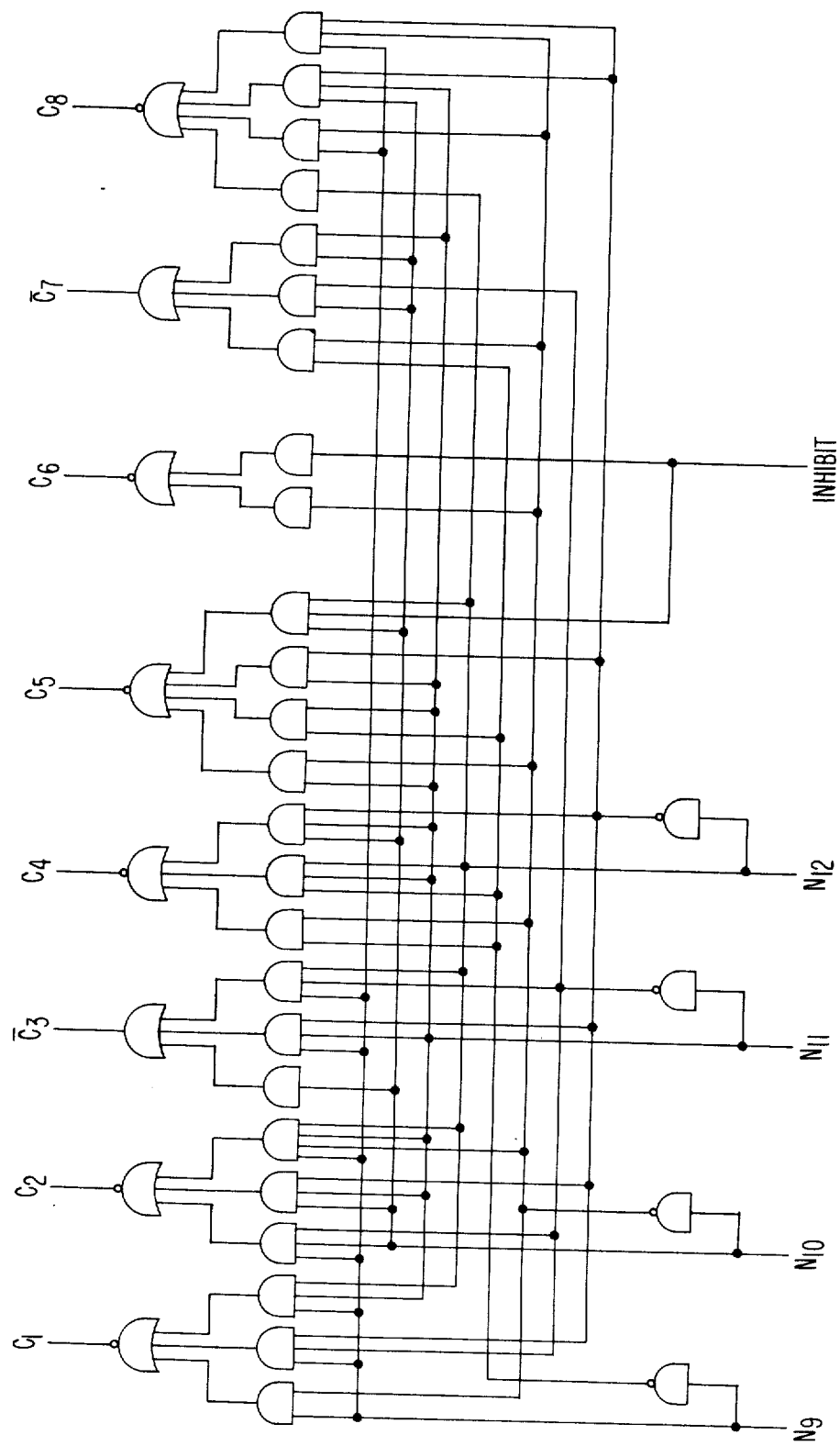

The various logic control units 68 and 69 of FIG. 3 and 97, 98 and 99 of FIG. 4 will now be described in reference to FIG. 8. Such controls are basically just standard decoders formed of a plurality of AND and NOR gates. However, the circuitry of FIG. 8 is presented to provide a better understanding of the various N control signals which are obtained from respective N instructions. The particular signals employed to control the respective logic groups of FIG. 3 comprise five N signals one of which is an inhibit signal. Upon the decoding of the signals $N_9$, $N_{10}$, $N_{11}$ and $N_{12}$, seven sub-control signals $C_1 \ldots , C_7$ are generated and supplied to the respective logic groups as indicated in FIG. 5 and described in relation to that figure. An eighth signal N 15 is also generated by the logic control of FIG. 2 and is supplied to the carry look-ahead half section corresponding to the logic half section in order to inhibit the generation of the least significant group carry signal for that logic half section as described above in relation to FIG. 7. Another inhibit signal is employed to inhibit the generation of the $C_5$ and $C_6$ signals. Referring briefly to FIG. 5, it will be noted that the $C_5$ and $C_6$ signals serve to implement the Z input to the logic group. Thus, the inhibit signal to the control circuitry of FIG. 8 serves to inhibit the Z input to the corresponding logic groups. The various functions provided by the respective logic groups under control of N control signals is listed in FIG. 20 under the heading of Adder Operation.

Figure 9:
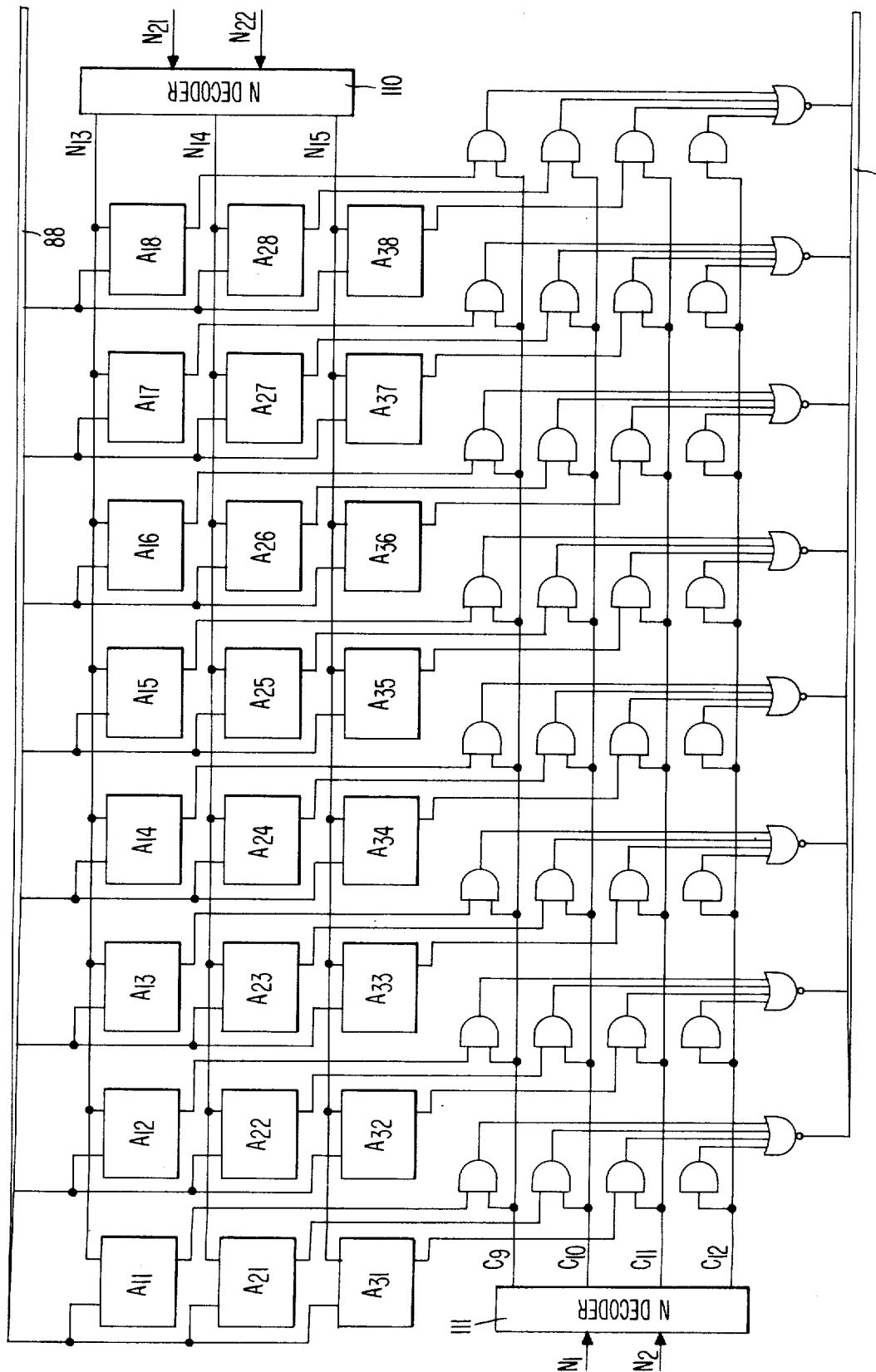
Figure 10:
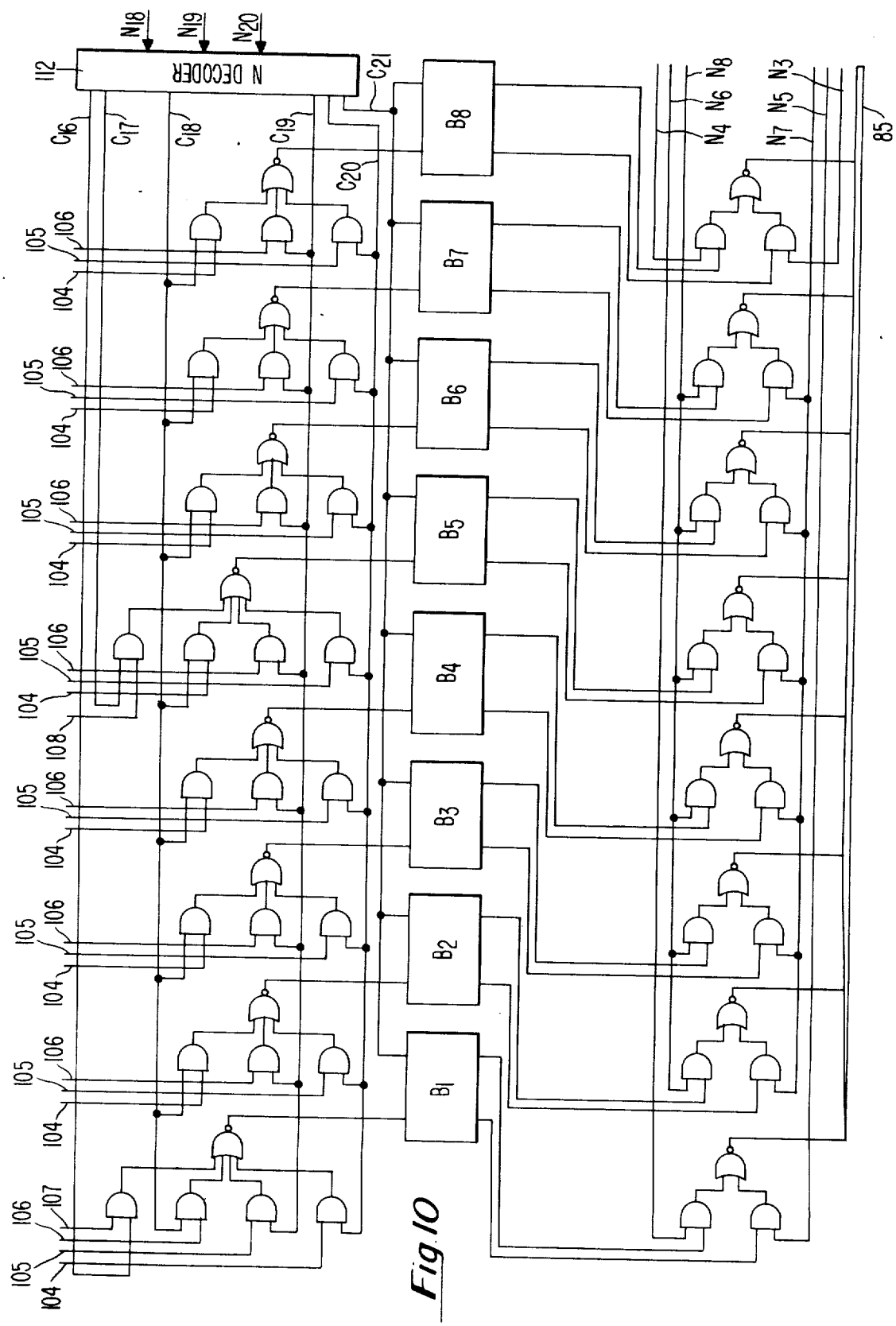
Figure 11:
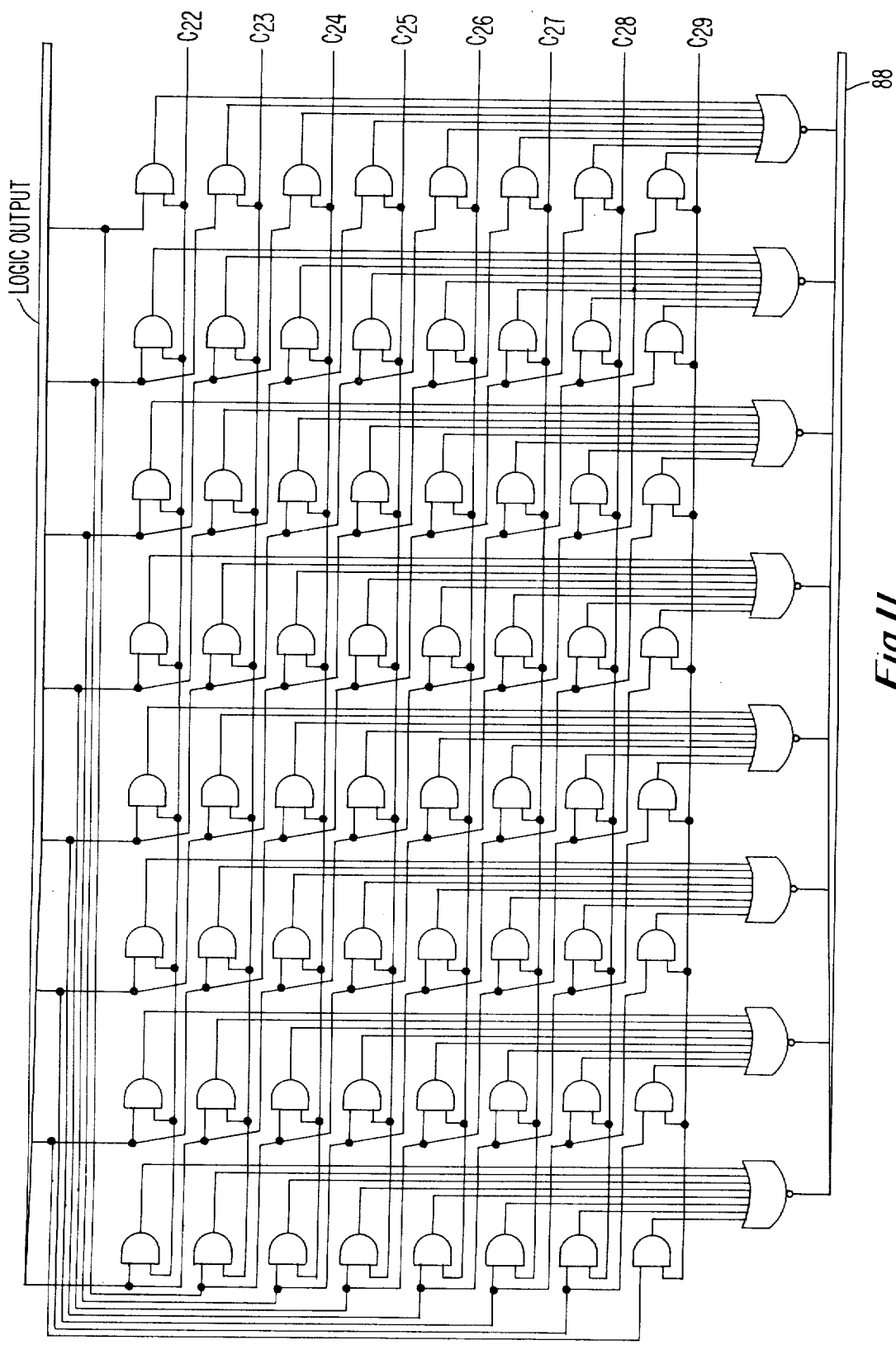

Other examples of the manner in which the N control signals of the N instruction format are employed to control ALU operations are illustrated in FIGS. 9, 10 and 11 which respectively illustrate the circuitry of the A registers, the B register and barrel switch operations.

As illustrated in FIG. 9, the three A registers A1, A2 and A3 are comprised respectively of three sets of flip-flops $A_{11} \ldots A_{18}$; $A_{21} \ldots , A_{28}$; $A_{31} \ldots , A_{38}$. As indicated in the table of FIG. 20, the A register inputs are under the control of two N signals $N_{21}$ and $N_{22}$ which respectively provide the function of keeping the A registers unchanged, providing an input to the A1 register, providing an input to the A2 register and providing an input to the A3 register. As indicated in FIG. 9, the respective control signals $N_{21}$ and $N_{22}$ are supplied to N decoder 110 which in turn provides three output signals $C_{13}$, $C_{14}$, and $C_{15}$ which are respectively supplied to the flip-flops of A1 register, A2 register and the A3 register. These signals may be of the type which normally urge the respective flip-flops to be reset at clock time thus preventing the setting of the flip-flops and, thus, the function of the control signals $N_{21}$ and $N_{22}$ is to inhibit any one of the C signals thus allowing data segments coming in over data bus 88 to be stored in any one of the register set of flip-flops.

As indicated in the table of FIG. 19, the A register outputs are under the control of the control signals $N_1$ and $N_2$ and serve to implement the read out of the A1 register, the A2 register and the A3 register or to provide out all zeros. The manner in which these operations are implemented is also illustrated in FIG. 9 where the control signals $N_1$ and $N_2$ are supplied to N decoder 111 which in turn provides four output signals $C_9 \ldots , C_{12}$. The signals $C_9$, $C_{10}$, $C_{11}$ are respectively supplied to AND gates to control the readout of the respective flip-flops of registers A1, A2, A3. However, the signal $C_{12}$ is supplied to the plurality of one input AND gates which by their respective selves will generate output signals that are inverted by the NOR gates as illustrated in FIG. 9 to provide ZERO outputs. The outputs of the NOR gates are supplied by way of bus 84 to the respective logic groups as has been illustrated in FIGS. 3 and 4 above.

Referring now to FIG. 10, the manner in which the control signals governing the B register operations will be described. As indicated in the table of FIG. 20, the B register inputs are controlled by three N signals, $N_{18}$, $N_{19}$ and $N_{20}$. In FIG. 10, these signals are supplied to N decoder 112 which in turn, generates the respective signals $C_{16}$ . . . , $C_{21}$. It will be remembered from the earlier discussion of the B register that the B register can receive data from the main memory, from the adder, from the barrel switches and also receive four bit and eight bit carries. Thus, signal $C_{16}$ serves to condition the appropriate AND gate to receive a signal over input lead 107 representing an eight bit carry, control signal $C_{17}$ serves to condition appropriate AND gate to receive the signal over input lead 108 representing a four bit carry, signal $C_{18}$ serves to condition the respective AND gate to receive data bits over the respective input leads 106, signal $C_{19}$ serves to condition the respective AND gates to allow for the receipt of the eight bit data segments for the respective leads 105 and signal $C_{20}$ serves to condition the respective AND gates to allow for the receipt of data bits over the respective leads 104. While the leads 104 are merely the connectors, they make up data bus 88 from the barrel switches which data bus also includes the respective leads 106 from the adder output.. Thus, the different C signals serve to gate the various incoming data bits to the respective flip-flops $B_1$ . . . , $B_8$ which form the B register. As indicated in FIG. 10, the $C_{21}$ control signal serves to set the respective flip-flops at clock time.

As indicated in the table of FIG. 19 under the heading of B Register Outputs, these operations are controlled by control signals $N_3$ . . . , $N_8$. These respective control signals are transmitted from the control portion, of the programmable unit of the present invention, to the corresponding gates in FIG. 10, the outputs of which form data bus 85 which connects the B register to the respective logic units.

It should be noted in relation to both FIGS. 9 and 10 that the registers illustrated therein are only eight bits wide. However, it will be appreciated that the registers can be expanded to handle any particular data width and that the only alteration that might be required would be the provision of extra drivers to supply sufficient current signals which drivers would nevertheless be under the control of the respective N signals as has been described above.

FIG. 11 is a schematic diagram of the barrel switches, two of which are employed in the present invention. These switches are of the type disclosed in the Stokes et al application, Ser. No. 789,886, filed Jan. 8, 1969, and assigned to the assignee of the present application. Thus, the barrel switches will not be discussed in detail except to indicate their control. The circuit of FIG. 11 is adapted to receive eight bit data segments from data bus 83 and to shift such bits right or left by an amount specified by the contents of SAR 44 of FIG. 2. The signals from SAR 44 are supplied to a decoder (not shown) which, under control of signals $N_{16}$ and $N_{17}$ from the instruction, selects the appropriate one of control lines $C_{22}$ . . . , $C_{29}$ as required to accomplish the desired shift. Thus, if the SAR contents specify a shift of three bits and the N instruction specifies a right shift, the decoder will supply an appropriate signal to lead $C_{25}$ as indicated in FIG. 11. If the N instruction specified a shift left (of three bits), then the decoder would supply a signal to lead $C_{27}$. The resulting shifted data segment is then routed back to data bus 88. The operations specified by the $N_{16}$ and $N_{17}$ signals are listed in the table of FIG. 19 under the heading of shift operations. It will be appreciated that the switch of FIG. 11 can be expanded to receive data segments of larger number of bits when the data path width of the programmable unit of the present invention is so expanded.

Brief mention will now be made on FIGS. 19 and 20. As was described in relation to the format of the N instruction of FIG. 15, this instruction is made up primarily of control signals which are required to be employed during different phases of the operation of the programmable unit of the present invention which will be more thoroughly described below. The three sets of section control or N signals are those employed in Phases 2 and 3, those employed in Phase 3 and those employed in Phase 1. FIG. 19 is a list of the N control signals which are employed during Phase 2 and 3. FIG. 20 is a list of the principle N control signals employed during Phase 3.

Figure 17:
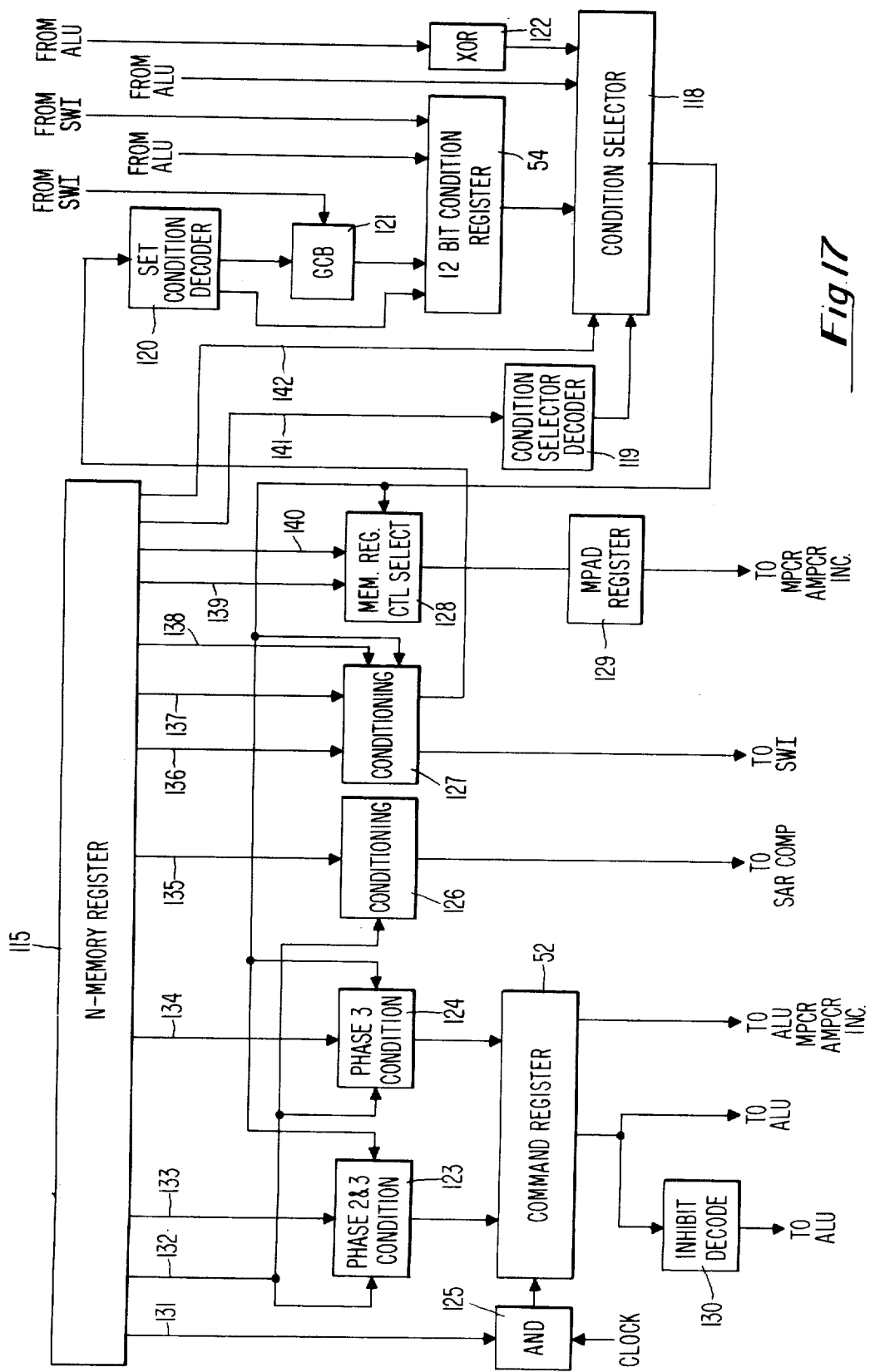
FIG. 17 is a schematic diagram of the second level sub-instruction decoder.

As has been indicated in the earlier portion of this specification, the N instructions are retrieved from the N memory and are, in essence, decoded or implemented by the N decoder 55 as illustrated in FIG. 2. This circuitry is shown in more detailed form in FIG. 17 and will now be described.

The N instruction of the format illustrated in FIG. 15 is received from the N memory output register 115 and transmitted to the various registers which serve to form test logic 53 as illustrated in FIG. 2. As indicated by the instruction format of FIG. 15, the N instruction includes Phase 1 control. Phase 2 and 3 controls and two other bits which specify a logic unit operation condition and a two clock time condition. The specific Phase 3 controls and Phase 2 and 3 controls have been described above in some detail. However, the Phase 1 controls have not been so described.. Suffice it to say that Phase I controls are those signals which are required during the first phase of an instruction execution and will now be described to the extent that such signals are required to implement the various condition registers of FIG. 17. Thus, one bit of the Phase 1 control field will specify whether or not the true or false states of the various condition bits of condition register 54 are to be tested. This signal will be transmitted to condition selector 118 by way of connector 142. Four other bits of Phase 1 field are employed to specify a particular condition to be. tesetd from among the various condition bits of condition register 54 and these four signals will be transmitted to condition selector decoder by way of bus connection 141.

Still another set of control bits in Phase 1 field are employed to specify a new M instruction address and these bits are transmitted by way of connections 139 and 140 to the memory register control select 128 which when conditioned by condition selector 118 will cause M program address register (MPAD) 129 to initiate a new address to be sent to the M memory by either MPCR 42 or AMPCR 41 of FIG. 2.

Phase 1 control field further includes bits specifying a memory or a device operation or a set operation as was described in the above General Description and these bits are transmitted by connectors 136 and 137 to conditioning register 127 such that when an appropriate condition is tested by condition selector 118, conditioning register 127 will transmit this information to the switch interlock and also set condition decoder 120 to set the appropriate condition bit in condition register 54. Another bit in the Phase 1 control field is one required to indicate a word complement of the contents of SAR register 44 of FIG. 2. This bit is transmitted to conditioning register 126 by connector 135 to activate the complement in the SAR 44. When a logic unit operation is to be performed, the appropriate bit in the N instruction format is transmitted by connector 132 to set condition registers 123 and 124 for the transfer of the Phase 2 and 3 controls and the transfer of Phase 3 controls to command register 52. When a two clock time instruction is to be executed, this is indicated by the first bit of the N instruction format and is transferred to AND gate 125 to be clocked to command register 52. The command register will now contain the appropriate Phase 2 and 3 controls and Phase 3 controls that have been described above and are required to control the respective logic and destination operations. The other signals required to set the respective condition bits of condition register 34 include a signal from the switch interlock to global condition bit 121 to set the appropriate global condition bits in condition register 54. The other condition bits to be set are set by signals received from the ALU or from the switch interlock as was described in the General Description above.

M instruction decoder 40 will now be described with reference to FIG. 18. It will be remembered from the discussion of the M instruction formats of FIG. 14 that a ONE in the zero significant bit indicates a type one instruction which contains an N address and that a ZERO in the zero significance bit indicates a literal instruction or type two instruction in which bit positions 1 and 2 specify various literal operations. In FIG. 18, these first three bits are tested by decoder 151. If the zero significant bit contains a ONE, then the contents of the MPM register 150 are transferred to address the N memory. If the zero bit is a ZERO and the first bit is a ONE, then the literal field of the M instruction is transferred to literal register 51 of FIG. 2. If the second significant bit position is a ONE then the contents of the SAR field as illustrated in FIG. 14 are transferred to SAR input selector 153. If the first three bit positions are zero then the remaining portion of the M instruction is a new M address and is transferred to AMPCR 41 of FIG. 2. If the first and second significant bit positions are both ones, decoder 151 activates control gate 152 to set literal register 51 to receive a data segment of different numbers of data bits as was described in regard to the M instruction format in the General Description above.

As was indicated above in the description of the N instruction decoder, the N instruction format contains certain bits in the Phase 1 field which are employed to specify data transfers to or from the programmable unit of the present invention. In order to better describe the manner in which such data transfers take place and also to illustrate the manner in which data and the various instructions are placed in their respective memories, reference will now be made to FIG. 12 that illustrates the switch interlock (SWI) which is indicated only generally in FIG. 1A. As indicated in FIG. 12, data and/or instructions may be supplied or written into any one of the three memories 20a, 20b and 20c by way of memory instruction register 47 or AMPCR 41, which are registers of the programmable unit as illustrated, from a peripheral device by way of switching unit 8 as indicated in FIG. 12 and also in FIGS. 1A and 1B. It will be noted that which register is connected to which memory will be determined by the Phase 1 field of the N instruction controlling the data transfer. As further indicated in FIG. 12, and has been described above, the N memory 20C is addressed from M decoder 40, the M memory 20b is addressed by the MPCR or the AMPCR by way of incrementer 43 and main memory or the S memory is addressed by way of MAR 49 when concatenated with register base register 45 or base register 46. The output of main memory 20a is to B register 33. The output of M memory 20b is M decoder 40 by way of MP buffer 25.

Although MP buffer 25 has not been described above, it serves an important function in allowing an entire string of M instructions to be retrieved upon the decoding of an S instruction thereby eliminating the time delay that would occur if the respective M instructions were to be separately addressed.

Although not explicitly shown in FIG. 12, it is understood that an alternative data path can be provided from MIR 47, AMPCR 41 and SU 8 directly to B register 33.

PHASE RELATIONS FOR M INSTRUCTION EXECUTION

As was indicated in the discussion of the M instruction format, there are two types of M instructions: type one instructions which implement logic and data transfer operations and type two instructions which contain litorals including a new M instruction address and shift amounts. The type one instruction is executed in three phases, the first and third of which each require one clock time with the second phase requiring a variable number of clock times. The type two instruction has only phase 1 which requires one clock time.

Successive M instructions are executed in an overlapped manner and this overlap and other characteristics thereof will now be described with reference to FIGS. 21, 22 and 23.

Figure 21:
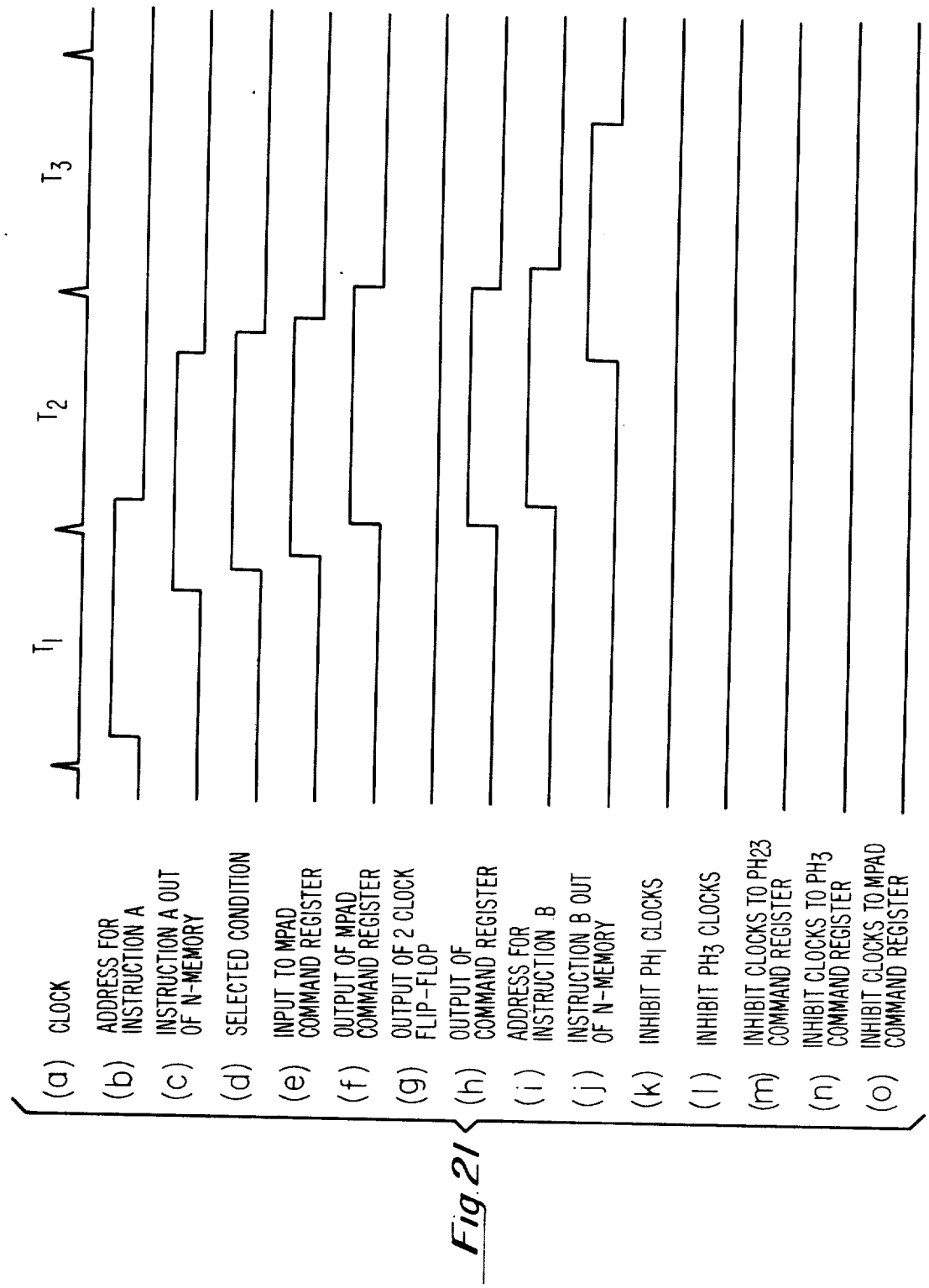

FIG. 21 illustrates the overlap in execution of two successive M instructions which shall be called Instruction A and Instruction B. It will be remembered that when the M instruction is of type one, then there is a corresponding N instruction to implement the various required operations. As indicated in waveform b of FIG. 21, the address for the corresponding N instruction A is transmitted to the N memory at the beginning of clock period $T_1$. The N instruction A is received from the N memory towards the end of this clock period as indicated in waveform c. The selected conditions are tested (waveform d) and the inputs are supplied to the MPAD register (waveform e). The output signals from MPAD register (waveform e) and the output of command register (waveform h) are generated at the beginning of clock period $T_2$. The command register is now free to receive a new instruction and thus, during this same clock period, a new address for the next Instruction B is generated as illustrated in waveform h. Instruction B is received out of the N memory shortly before the end of clock period $T_2$ as indicated in waveform j. The other waveforms in FIG. 21 which indicate the setting of two clock flip-flops and various inhibit signals are not employed in this operation. It will be noted from FIG. 21 that the execution of the Phase 1 controls of Instruction B occurred at the end of clock period $T_2$ and thus the Phase 1 controls of Instruction B are implemented during Phase 3 of Instruction A.

Referring now to FIG. 22, the execution of a type one instruction in which Phase 2 requires two clock periods will now be described. As indicated in FIG. 22, the respective waveforms b . . . , e are the same as in FIG. 21 since they represent the retrieval of the first Instruction A. In this case however, the retrieved N instruction format will contain a bit indicating a two clock time operation as has been described above in relation to FIG. 17. This causes a two clock time flip-flop to be set as indicated in waveform g of FIG. 22 and, as a result, the output signals of MPAD register and the command register as represented in waveforms f and h are delayed for one clock period as required for the two clock time operation. Similarly, the addressing and receipt of Instruction B from the M memory is also delayed for a clock period until the two clock time operation of Instruction A has been carried out during clock periods $T_2$ and $T_3$, as indicated by waveform j. Phase one of Instruction B is therefore executed at the end of clock period $T_3$, the various clocks having been inhibited at the end of clock time $T_2$. Phase two and/or three will be executed during $T_4$.

Referring now to FIG. 23, the timing relation between two successive instructions will now be described where the second M instruction B contains a literal and thus requires no N instruction. As indicated in FIG. 23, the first five waveforms (waveforms b . . . , f) are the same in FIG. 23 as in FIG. 21 and represent the retrieval and execution of the first phase of Instruction A. Furthermore, the output from the command register (waveform h in FIG. 21 and waveform g in FIG. 23) is initiated at the beginning of clock period $T_2$. Furthermore, the addressing of the M memory for Instruction B also occurs at the same time in both figures. However, the receipt of M instruction (waveform i in FIG. 23) occurs earlier than does the receipt of the N instruction of FIG. 21 (waveform j) and, since Instruction B is a literal in FIG. 23, no N instruction is required. This causes M decoder 40 of FIG. 2 to generate a hold signal as indicated in waveform m of FIG. 23. As a result, the output of command register (waveform g of FIG. 23) is maintained while the literals of the M instruction B are transferred to a respective register as indicated by waveform i of FIG. 23. In virtual concurrence with the hold signal of waveform m, the various phase clocks are inhibited as shown in waveform n to allow for the literal transfers at the end of clock period $T_2$. The literal transfers having occurred, the output of the command register then remains valid until the end of clock period $T_3$ as indicated in waveform g. In this manner, the execution of a type 1 M instruction has been delayed to allow for literal transfers by the next succeeding type two instructions. Assume the literal of the B Instruction specifies a new M address. Then the MPAD is forced as indicated in waveform j to again address M memory (waveform k) to retrieve a new instruction from M memory and then it's N counterpart from N memory as indicated in waveform e. The instruction from N memory is received at the end of clock period $T_3$ when the hold and inhibit signals are no longer up.

While the timing diagrams thus described represent only a few of the different situations that arise during the execution of successive instructions in an overlapped manner, it is believed that the above description will be sufficient to indicate how this overlapped instruction execution takes place and also how, for example, different literal information may be replaced in the respective registers when required for the execution of a conditional M instruction.

M INSTRUCTION SEQUENCES

While the significance of S instructions and N instructions have been fairly well described above, the significance of the M instruction may require more description. To this end strings or sequences of M instructions are illustrated in FIGS. 24 and 25 and will now be briefly described.

FIG. 24 illustrates a sequence of M instructions that would be employed in a particular input-output operation specified by an I-O descriptor of the type illustrated in FIG. 13. Each step of the sequence requires an M instruction execution. These steps are: transfer contents of MAR to A2 register; transmit "device write" signal and transfer the contents of A1 register and least significant character of B register plus ONE to A1 register; transmit "unlock device read" signal; read from device and shift contents of B register left 4 bits and place in A3 register; when MAR is ready, transfer contents of A1 register plus ONE to A1 register and MAR; when B register is ready transfer contents of B register to A2 register and read from device; when MAR is ready, transfer contents of A2 register to MAR; when B register is ready, transfer its contents to MIR; send MIR contents to memory and shift contents of A3 register right 8 bits.

Another M string is illustrated in FIG. 25 which is adapted to implement a "string scan" routine specified by an S instruction. This routine is to find all starting positions of all matches of a pattern string in a source string. The legend in FIG. 25 lists which registers will contain the respective data segments that make up the source location S, pattern location P, source contents SC, pattern content PC, match indication M, pointers SP, PP and MP and the register base registers.

While particular embodiments of the present invention have been described and illustrated, it will be apparent to those skilled in the art that changes and modifications may be made therein without departing from the spirit and scope of the invention as claimed.

What is claimed is:

1. A programmable unit including a logic unit coupled to a plurality of registers for data transfer, said programmable unit comprising:

circuit means coupled to said logic unit and registers to transmit thereto different specific sets of control signals;

a control memory to store a plurality of different sets of control signals, said control memory being coupled to said circuit means;

a command memory to store a plurality of retrievable encoded operational commands some of which specifiy given ones of said sets of control signals;

a command decoder coupled to said control memory and to said command memory to retrieve given ones of said specific sets of control signals to condition either said logic unit or said registers;

clock means coupled to said command decoder to generate timing pulses representing phases during which said sets of control signals are implemented; and addressing means coupled between said command decoder and said control memory and adapted to retrieve a set of control signals during the implementation of a previous set of control signals.

2. A programmable unit according to claim 1 including:
 delay means coupled to said clock means to inhibit certain timing pulses to inhibit implementation of said previous set of control signals to allow for retrieval of a new command instruction.

3. A programmable unit including a first memory to store instructions specifying routines and a second memory to store sets of operational command instructions, said programmable unit comprising;
 first means coupled to said first memory and adapted to receive one of said routine instructions;
 second means coupled to said first means and to said second memory and responsive to the recept of said routine instruction to address said second memory and receive a command instruction, said second means including addressing means adapted to retrieve a command instruction during the implementation of a previous command instruction;
 clock means coupled to said second means to generate timing pulses representing phases during which said command instructions are implemented; and
 delay means coupled to said clock means to inhibit certain timing pulses to inhibit implementation of said previous command instruction to allow for retrieval of a new command instruction.

4. A programmable unit according to claim 3 including:
 a plurality of registers for data transfer;
 a command decoder coupled to said second memory and to said plurality of registers to receive said command instructions from said second memory to activate data transfer between selected ones of said registers.

5. A programmable unit according to claim 4 including:
 a literal register coupled to said second memory and adapted to receive data literals from said second memory.

6. A programmable unit according to claim 4 including:
 an external peripheral device; and
 a peripheral communication bus coupled to said external peripheral device;
 at least one of said registers being coupled to said peripheral communication bus to implement data transfers to or from said peripheral device;
 said command decoder being adapted to receive from said second memory certain sequences of command instructions to specify logic operations and other sequences of command instructions to specify data transfers to or from said peripheral device.

7. A programmable unit according to claim 3 wherein:
 said first means includes a register to receive routine instructions in response to the receipt of a command instruction by said second means.

8. A programmable unit including a plurality of registers for data transfer, said programmable unit comprising:
 circuit means coupled to said registers to transmit thereto different specific sets of control signals;
 a control memory portion to store a plurality of different sets of control signals, said control memory portion being coupled to said circuit means;
 a control memory addressing means coupled to said control memory portion to retrieve given ones of said specific sets of control signals; and
 clock means coupled to said circuit means to generate timing pulses representing different phases during which said sets of control signals are implemented.

9. In a programmable unit including a first memory portion, a second memory portion, and a plurality of registers for data transfer, a method comprising:
 storing a plurality of retrievable encoded operational commands in said first memory portion, some of which commands specify given sets of control signals;
 storing said given sets of control signals in said second memory portion;
 retrieving given ones of said commands from said first memory portion to specify retrieval of said given sets of control signals from said second memory;
 transmitting one of said given sets of control signals to said registers to condition them for operation; and
 generating a plurality of distinct timing phases for each of said one of said given sets of control signals, said registers being condition corresponding to each individual set of said one of said given sets of transmitted signals during distinct ones of said generated plurality of distinct timing phases.

10. The method of claim 9 further including the step of:
 overlapping the implementation of an individual set of said one of said given sets of transmitted control signals with an individual set of another of said given sets of transmitted control signals.

11. In a clock controlled programmable unit including a first memory to store sets of instructions specifying routines, a second memory to store operation command instructions to implement said routine instructions, an address register coupled between said first and second memories, a third memory to store control instructions to implement said command instructions, a decoder coupled to said second and third memories to receive command instructions and to access said third memory, and a clock inhibit means coupled to said decoder, said respective instructions being formed of sets of signals; the method comprising the following steps:
 storing, in said second memory, a first set of signals representing a first command instruction which when fetched from said second memory to said decoder will effect an operation to be executed by said programmable unit; and
 storing, in said second memory, a second set of signals representing a second command instruction which when fetched from second memory to said decoder will effect a delay of said operation execution by at least one clock time.

12. A method according to claim 11 wherein said programmable unit further includes a condition register coupled to said decoder, which condition register may reside in a plurality of condition states, and wherein:
 the second storing step includes the storing of a second set of signals which, when fetched from said second memory, effects a testing of said condition register to determine its state.

13. A method according to claim 11 wherein said programmable unit includes a data shifting network coupled to said decoder, and wherein:
the first storing step includes the storing of a first set of signals which, when fetched from said second memory, effects a shift of said data shifting network; and
the second storing step includes the storing of a second set of signals which contains signals to establish the number of bit positions by which said data is to be shifted.

* * * * *